US005541838A

United States Patent [19]

Koyama et al.

[11] Patent Number: 5,541,838

[45] Date of Patent: * Jul. 30, 1996

[54] TRANSLATION MACHINE HAVING CAPABILITY OF REGISTERING IDIOMS

[75] Inventors: Noriyuki Koyama, Yamato-Koriyama; Ichiko Sata, Nara; Yoji Fukumochi, Ikoma-gun; Hitoshi Suzuki, Nara, all of Japan

[73] Assignee: Sharp Kabushiki Kaisha, Osaka, Japan

[ * ] Notice: The term of this patent shall not extend beyond the expiration date of Pat. No. 5,475,586.

[21] Appl. No.: 142,778

[22] Filed: Oct. 25, 1993

[30] Foreign Application Priority Data

| | | | |
|---|---|---|---|
| Oct. 26, 1992 | [JP] | Japan | 4-287492 |
| Oct. 30, 1992 | [JP] | Japan | 4-293372 |
| Nov. 6, 1992 | [JP] | Japan | 4-297182 |

[51] Int. Cl.[6] .................... G06F 17/28

[52] U.S. Cl. .................... 364/419.04; 364/419.11; 364/419.02

[58] Field of Search .................... 364/419.02, 419.03, 364/419.04, 419.05, 419.08, 419.09; 395/700

[56] References Cited

U.S. PATENT DOCUMENTS

| | | | |
|---|---|---|---|
| 4,412,305 | 10/1983 | Yoshida | 364/419.04 |
| 4,641,264 | 2/1987 | Nitta et al. | 364/419.04 |
| 4,685,060 | 8/1987 | Yamano et al. | 364/419.04 |
| 4,774,666 | 9/1988 | Miyao et al. | 364/419.02 |
| 4,800,522 | 1/1989 | Miyao et al. | 364/419.02 |
| 4,831,529 | 4/1989 | Miike et al. | 364/419.04 |
| 4,894,779 | 1/1990 | Suzuki et al. | 364/419.02 |
| 4,914,590 | 4/1990 | Loatman et al. | 364/419.08 |
| 4,942,526 | 7/1990 | Okajima et al. | 364/419.08 |
| 4,962,452 | 10/1990 | Nogami et al. | 364/419.05 |
| 5,005,127 | 4/1991 | Kugimiya et al. | 364/419.02 |
| 5,175,684 | 12/1992 | Chong | 364/419.03 |
| 5,214,583 | 5/1993 | Miike et al. | 364/419.04 |
| 5,225,981 | 7/1993 | Yokogawa | 364/419.02 |
| 5,321,607 | 6/1994 | Fukumochi et al. | 364/419.04 |
| 5,321,608 | 6/1994 | Namba et al. | 364/419.08 |
| 5,353,221 | 10/1994 | Kutsumi et al. | 364/419.05 |

FOREIGN PATENT DOCUMENTS

| | | | |
|---|---|---|---|
| 58-92064 | 6/1983 | Japan . | |
| 58-92063 | 6/1983 | Japan | C06F 15/38 |
| 61-243565 | 10/1986 | Japan | G06F 15/38 |
| 61-267175 | 11/1986 | Japan | G06F 15/38 |
| 01-207874 | 8/1989 | Japan | G06F 15/38 |
| 1-292576 | 11/1989 | Japan . | |
| 02-254564 | 10/1990 | Japan | G06F 15/38 |
| 02-288976 | 11/1990 | Japan | G06F 15/38 |
| 04-313158 | 11/1992 | Japan | G06F 15/38 |
| 05-108710 | 4/1993 | Japan | G06F 15/38 |

*Primary Examiner*—Gail O. Hayes
*Assistant Examiner*—Joseph Thomas
*Attorney, Agent, or Firm*—David G. Conlin; Kevin J. Fournier

[57] ABSTRACT

A translation machine is provided with an idiom registering capability. If a header standing for a idiom contains two or more variable parts, these parts are represented by representative symbols. With this representing method, the idiom is allowed to be easily registered and retrieved. This makes it possible to shorten the registering time, reduce the translating toil and prevent increase of information storage capacity. The translation machine includes an input unit, a storing unit, an output unit, an idiom registering unit, and a translating unit for performing a routine translating operation. The idiom registering unit operates to register an idiom header with two or more representative symbols standing for words or word trains sharing a predetermined attribute.

7 Claims, 45 Drawing Sheets

Fig. 5 (ii)
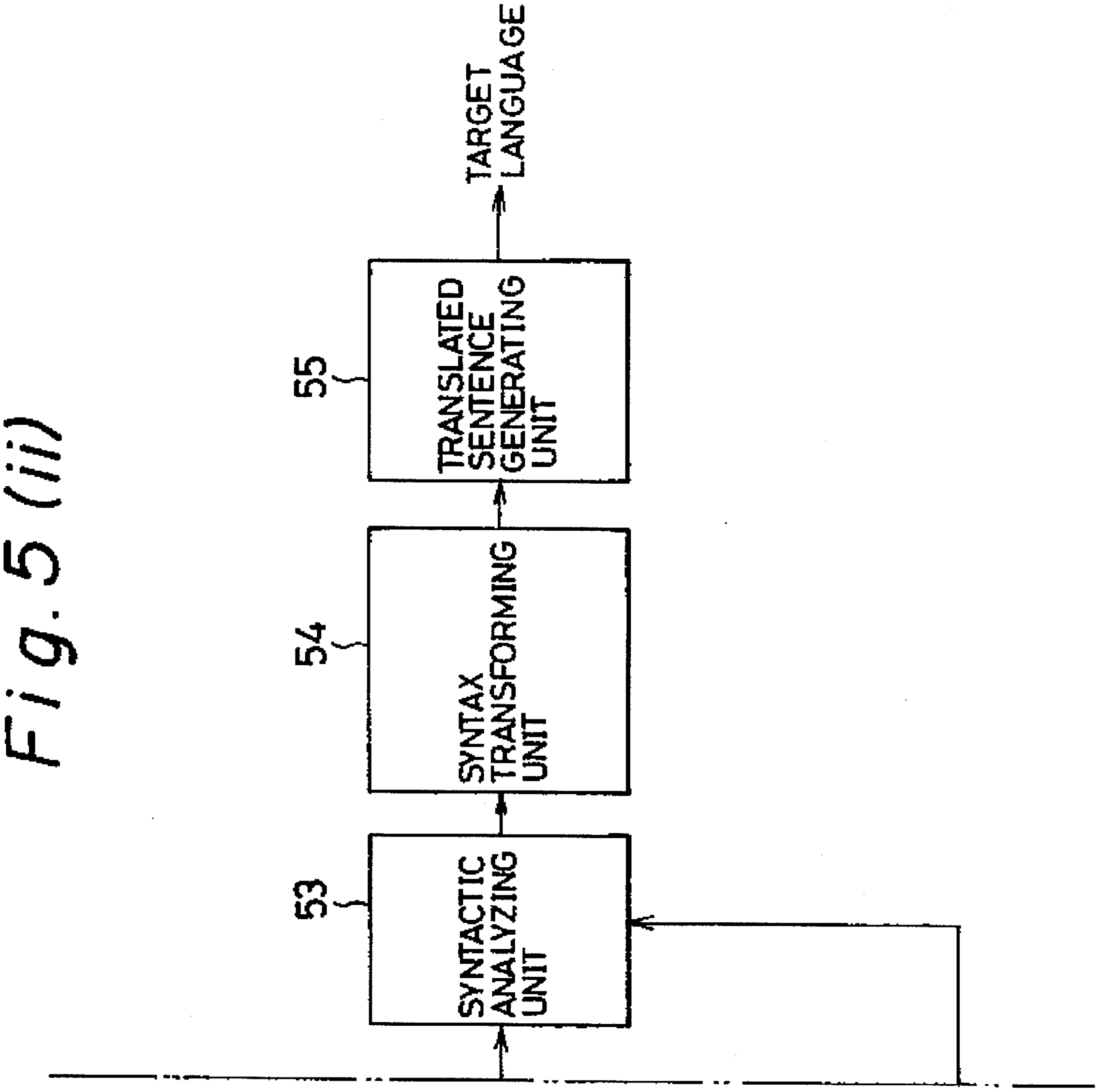

Fig. 6

EXAMPLE (This is a pen.)

BUFFER A : ORIGINAL SENTENCE BUFFER

| | | | | | | | |
|---|---|---|---|---|---|---|---|
| t | h | i | s | | | | |
| i | s | | | | | | |
| a | | | | | | | |
| p | e | n | | | | | |
| . | | | | | | | |

Fig. 7

BUFFER B : PART OF BUFFER FOR DICTIONARY-LOOK UP RESULT

| | | | |
|---|---|---|---|
| this--- | PRNOUN | INDICATIVE ADJECTIVE | |
| is--- | VERB | | |
| a--- | ARTICLE | | |
| pen--- | NOUN | | |

BUFFER C : BUFFER FOR SYNTACTIC ANALYZED RESULT

BUFFER D : BUFFER FOR TREE TRANSFORMED RESULT

Fig. 10

BUFFER E : BUFFER FOR OUTPUT SENTENCE

| |
|---|
| これはペンである。 |

Fig. 11

REPRESENTATIVE SYMBOL TABLE

| TERMINAL REPRESENTATIVE SYMBOL | |
|---|---|
| *m | NUMERAL |
| *1 | PRONOUN (POSSESSIVE) |
| *2 | PRONOUN (REGENERATIVE) |
| *3 | PRONOUN (SUBJECTIVE) |
| *4 | PRONOUN (OBJECTIVE) |
| *n | NOUN |
| *a | ADJECTIVE |
| *d | ADVERB |
| *p | PREPOSITION |
| *v | VERB |
| *x | AUXILIARY VEAB |
| *c | CONJUNCTION |
| **NON-TERMINAL REPRESENTATIVE SYMBOL** | |
| *C | SENTENCE |
| *T | that CLAUSE |
| *I | TO INFINITIVE PHRASE |
| *N | NOUN PHRASE |
| *A | PREDICATIVE ADJECTIVE PHRASE |
| *P | PREPOSITION PHRASE |
| *J | PARTICIPIAL ADJECTIVE PHRASE |
| *D | ADVERB PHRASE |

Fig. 12

| | |
|---|---|
| ENGLISH WORD | as *a as can be |
| PART OF SPEECH | |
| TRANSLATED WORD | この上もなく *a |
| PART OF SPEECH | |

Fig. 13

| | |
|---|---|
| ENGLISH WORD | as **a as *I |
| PART OF SPEECH | |
| TRANSLATED WORD | *I [体:] ほど *a |
| PART OF SPEECH | |

Fig. 14

| | |
|---|---|
| ENGLISH WORD | *mN1 through *mN2 |
| PART OF SPEECH | NOUN PHRASE |
| TRANSLATED WORD | *mN1 から *mN2 まで |
| PART OF SPEECH | THE OTHER |

Fig. 15

| | |
|---|---|
| ENGLISH WORD | *m times as **ad as *3 *x |
| PART OF SPEECH | |
| TRANSLATED WORD | *m 倍 *3 より *ad |
| PART OF SPEECH | |

Fig. 16

| | |
|---|---|
| ENGLISH WORD | *m times as **ad as *CN |
| PART OF SPEECH | |
| TRANSLATED WORD | *m 倍 *C [体:] N より *ad |
| PART OF SPEECH | |

Fig. 17 (ii)
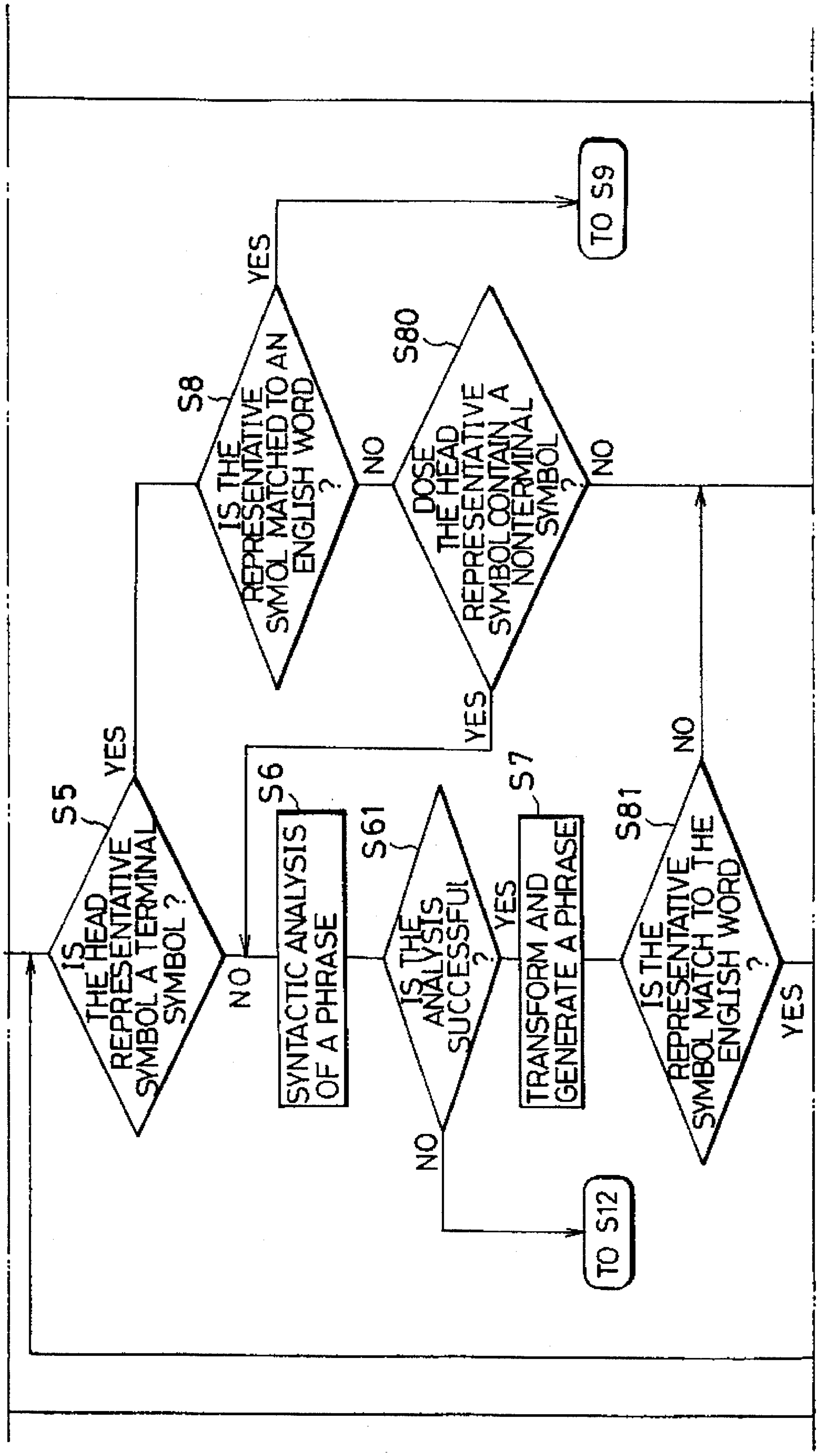

Fig. 17 (iii)
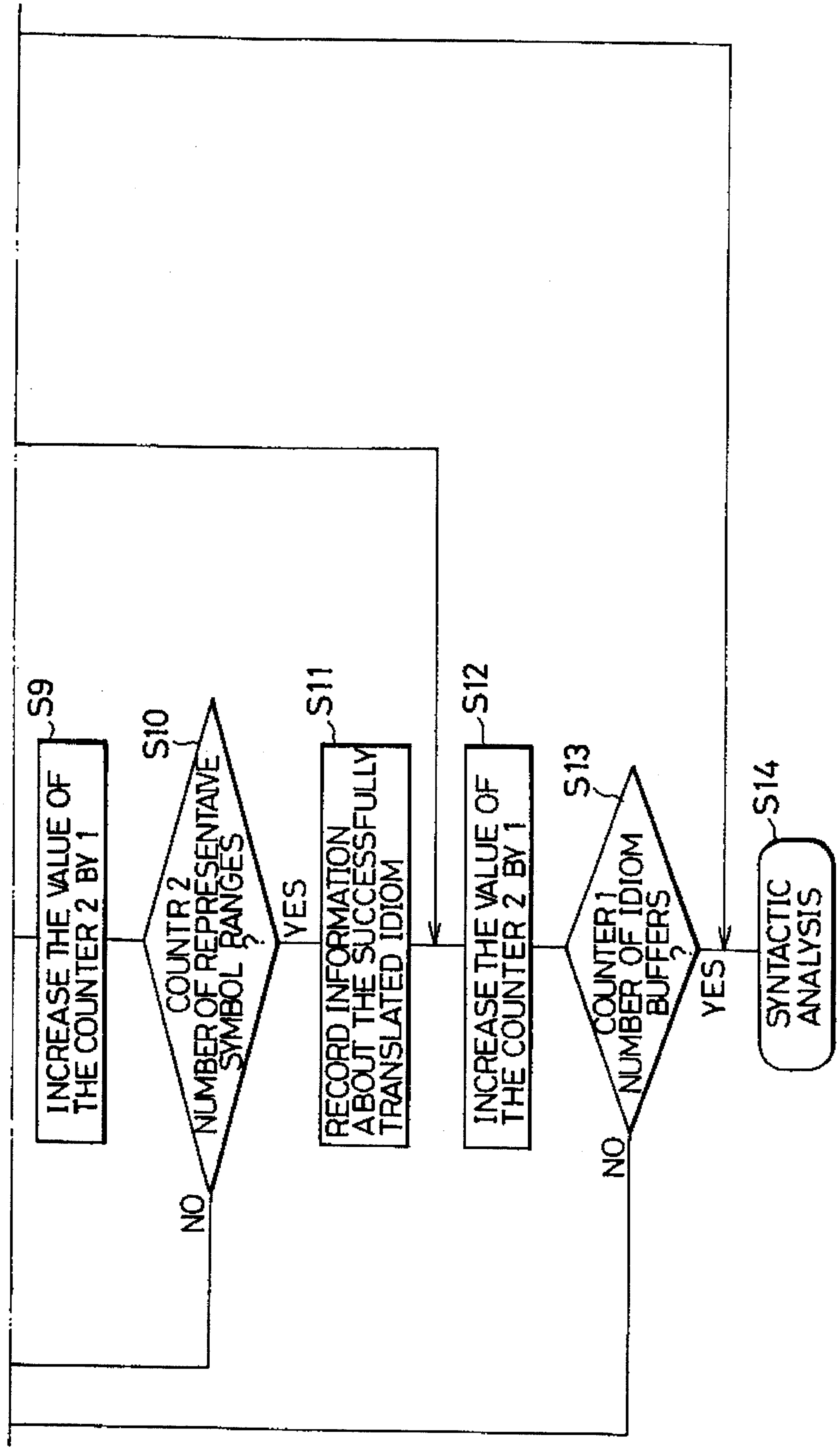

Fig. 18

GRAMMATICAL RULES

| | |
|---|---|
| 1 | CLAUS —> NP VP |
| 2 | VP —> VERB |
| 3 | VP —> VERB NP |
| 4 | NP —> PRON |
| 5 | NP —> NOUN |
| 6 | NP —> DBT NOUN |
| 7 | NP —> ADJ NOUN |
| 8 | ADJP —> ADJ |
| 9 | ADJP —> ADV ADJ |
| 10 | ADVP —> ADV |

Fig. 19

CONTENT OF PART OF SPEECH BUFFER

| | | |
|---|---|---|
| 1 | t h i s | DEFINITIVE, PRONOUN |
| 2 | a p p l e | NOUN |
| 3 | i s | b e VERB |
| 4 | t h r e e | NUMERAL |
| 5 | t i m e s | NOUN, VERB |
| 6 | a s | PREPOSITION<br>SUBORDINATE CONJUNCTION |
| 7 | b i g | ADJECTIVE |
| 8 | a s | PREPOSITION<br>SUBORDINATE CONJUNCTION |
| 9 | t h a t | PRONOUN, DEFINITIVE<br>RELATIVE PRONOUN |
| 10 | o r a n g e | NOUN |

Fig. 20

IDIOM BUFFER

| | | |
|---|---|---|
| 1 | three | *m |
| 2 | big | *a d |
| 3 | that | * 3 |
| 4 | orange | * x |

Fig. 21

IDIOM BUFFER

| | | |
|---|---|---|
| 1 | three | *m |
| 2 | big | *ad |
| 3 | that orange | *CN |

Fig. 22

| | |
|---|---|
| ENGLISH WORD | three times as big as that orange |
| PART OF SPEECH | ADJECTIVE PHRASE |
| TRANSLATED WORD | 3倍あのオレンジより大きい |
| PART OF SPEECH | ADJECTIVE |

Fig. 23

| | | |
|---|---|---|
| 1 | ENGLISH WORD<br>PART OF SPEECH<br>TRANSLATED WORD<br>PART OF SPEECH | t h i s<br>PEFINITIVE, PRONOUN<br>この，これ<br>DEFINITIVE, PRONOUN |
| 2 | ENGLISH WORD<br>PART OF SPEECH<br>TRANSLATED WORD<br>PART OF SPEECH | a p p l e<br>NOUN<br>りんご<br>NOUN |
| 3 | ENGLISH WORD<br>PART OF SPEECH<br>TRANSLATED WORD<br>PART OF SPEECH | i s<br>be VERB<br>〜である、〜だ，「」<br>VEAB |
| 4 | ENGLISH WORD<br>PART OF SPEECH<br>TRANSLATED WORD<br>PART OF SPEECH | three times as big that orange<br>ADJECTIVE PHRASE<br>3倍あのオレンジより大きい<br>ADJECTIVE |

Fig. 24

SPECIAL SYMOL TABLE

| TERMINAL SPECIAL SYMBOLS | |
|---|---|
| *m | NUMERAL |
| *1 | PRONOUN (POSSESSIVE) |
| *2 | PRONOUN (REGENERATIVE) |
| *3 | PRONOUN (SUBJECTIVE) |
| *4 | PRONOUN (OBJECTIVE) |
| *n | NOUN |
| *a | ADJECTIVE |
| *d | ADVERB |
| *p | PREPOSITION |
| *v | VERB |
| *x | AUXILIARY VERB |
| *c | CONJUNCTION |
| @1 | CLASSIFYING TABLE 1 |
| @2 | CLASSIFYING TABLE 2 |
| : | |
| : | |
| @n | CLASSIFYING TABLE n |

| NON-TERMINAL SPECIAL SYMBOLS | |
|---|---|
| *C | SENTENCE |
| *T | THAT CLAUSE |
| *I | TO INFINITIVE |
| *N | NOUN PHRASE |
| *A | PREDICATIVE ADJECTIVE PHRASE |
| *P | PREPOSITION PHRASE |
| *J | PARTICIPIAL ADJECTIVE PHRASE |
| *D | ADVERB PHRASE |

Fig. 25

CURRENCY UNIT

| | | | |
|---|---|---|---|
| ◎1 | money | US$ | ドル、アメリカドル |
| | | $ | ドル |
| | | A$ | オーストラリアドル |
| | | DM | ドイツマルク |
| | | SFr | スイスフラン |
| | | FFr | フランスフラン |
| | | HK$ | 香港ドル |
| | | £ | ポンド |
| | | Lila | リラ |
| | | C$ | カナダドル |
| | | BFr | ベルギーフラン |
| | | ¥ | 円 |
| | | Y | 円 |

Fig. 26

WEIGHT UNIT

| | | |
|---|---|---|
| @2 weight | gram | グラム |
| | g | グラム |
| | Kirogram | キログラム |
| | Kg | キログラム |
| | pound | ポンド |
| | 1b | ポンド |
| | ounce | オンス |
| | oz | オンス |

Fig. 27

CONVEYANCES

| | | |
|---|---|---|
| @3 conveyances | train | 電車 |
| | plane | 飛行機 |
| | airplane | 飛行機 |
| | bus | バス |
| | ship | 船 |
| | ferry | フェリー |
| | car | 車、自動車 |
| | automobile | 車、自動車 |
| | bicycle | 自転車 |

Fig. 28

| | |
|---|---|
| ENGLISH WORLD | be quoted at @1 *m |
| PART OF SPEECH | Verb |
| TRANSLATED COUNTERPART | @1 *mの値がつく |
| PART OF SPEECH | Verb |

Fig. 29

| | |
|---|---|
| ENGLISH WORD | *m @2 lighter than *N |
| PART OF SPEECH | Adjective |
| TRANSLATED COUNTERPART | *Nより *n @2 軽い |
| PART OF SPEECH | Adjective |

Fig. 30

| | |
|---|---|
| ENGLISH WORD | take @3 to the school |
| PART OF SPEECH | Verb |
| TRANSLATED COUNTERPART | @3で学校に通学する |
| PART OF SPEECH | Verb |

Fig. 31 (ii)
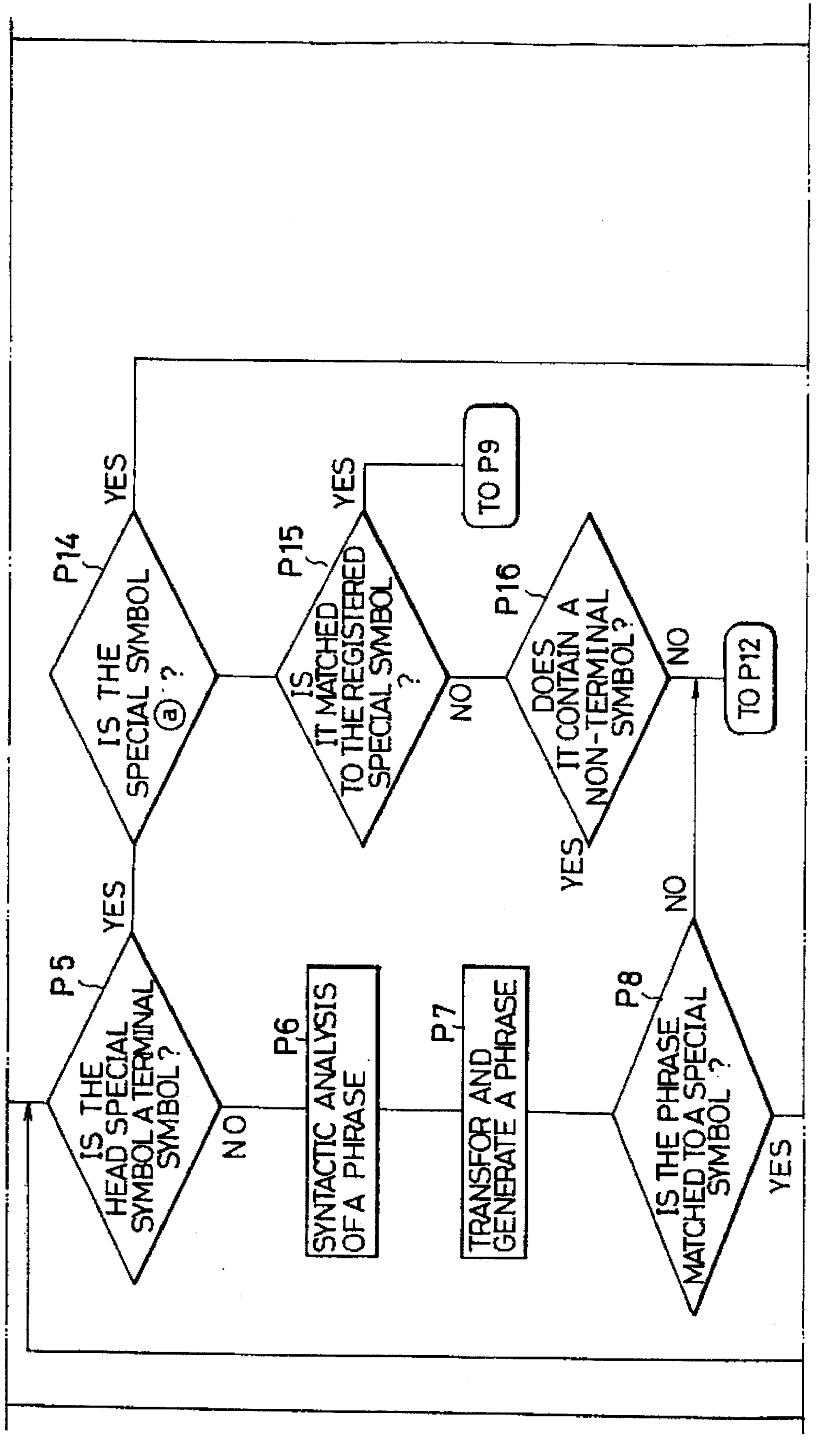

*Fig. 31 (iii)*
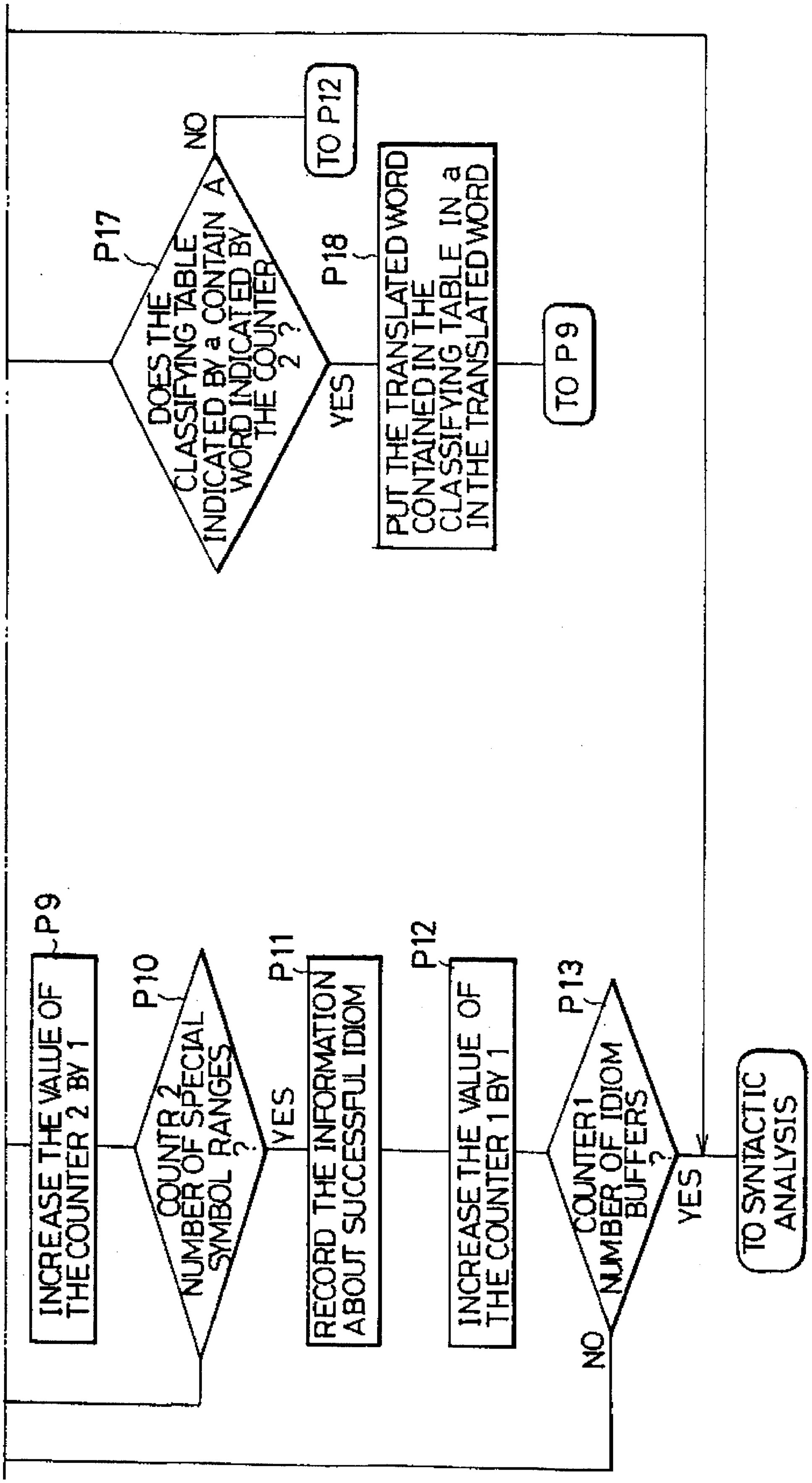

Fig. 32

PART-OF-SPEECH BUFFER

| | | |
|---|---|---|
| 1 | he | PRONOUN |
| 2 | is | BE VERB |
| 3 | ten | NUMERAL |
| 4 | pound | NOUN |
| 5 | lighter | ADJECTIVE |
| 6 | than | PREPOSITION, SUBORDINATE CONJUNCTION |
| 7 | that | PRONOUN, DEFINITIVE, RELATIVE PRONOUN |
| 8 | man | NOUN |

Fig. 33

IDIOM BUFFER

| | | |
|---|---|---|
| 1 | ten | *m |
| 2 | pound | @2 |
| 3 | that orange | *N |

Fig. 34

| | |
|---|---|
| ENGLISH WORD | ten pound lighter than that man |
| PART OF SPEECH | Adjective |
| TRANSLATED COUNTERPART | あの男より10ポンド軽い |
| PART OF SPEECH | Adjective |

Fig. 35

| | | |
|---|---|---|
| 1 | ENGLISH WORDS<br>PART OF SPEECH<br>TRANSLATED COUNTERPART<br>PART OF SPEECH | he<br>Pronoun<br>彼<br>Pronoun |
| 2 | ENGLISH WORDS<br>PART OF SPEECH<br>TRANSLATED COUNTERPART<br>PART OF SPEECH | IS<br>be verb<br>である、だ、[]<br>Verb |
| 3 | ENGLISH WORDS<br>PART OF SPEECH<br>TRANSLATED COUNTERPART<br>PART OF SPEECH | ten pound lighter than that man<br>ADJECTIVE<br>あの男より10ポンド軽い<br>ADJECTIVE |

Fig. 36

| | |
|---|---|
| ENGLISH WORD | a[majority minority] of |
| PART OF SPEECH | ADJECTIVE |
| TRANSLATED WORD | [大多数\|小数]の |
| PART OF SPEECH | THE OTHER |

Fig. 37

| | |
|---|---|
| ENGLISH WORD | all [the\|_] year round |
| PART OF SPEECH | ADVERB |
| TRANSLATED WORD | 一年中 |
| PART OF SPEECH | THE OTHER |

Fig. 38

| | |
|---|---|
| ENGLISH WORD | as [a\|the] 1 result [of\|_] 2 |
| PART OF SPEECH | [PREPUSITION\|ADVERB] 2 |
| TRANSLATED WORD | [の\|_] 2 結果として |
| PART OF SPEECH | THE OTHER |

Fig. 39C(ii)
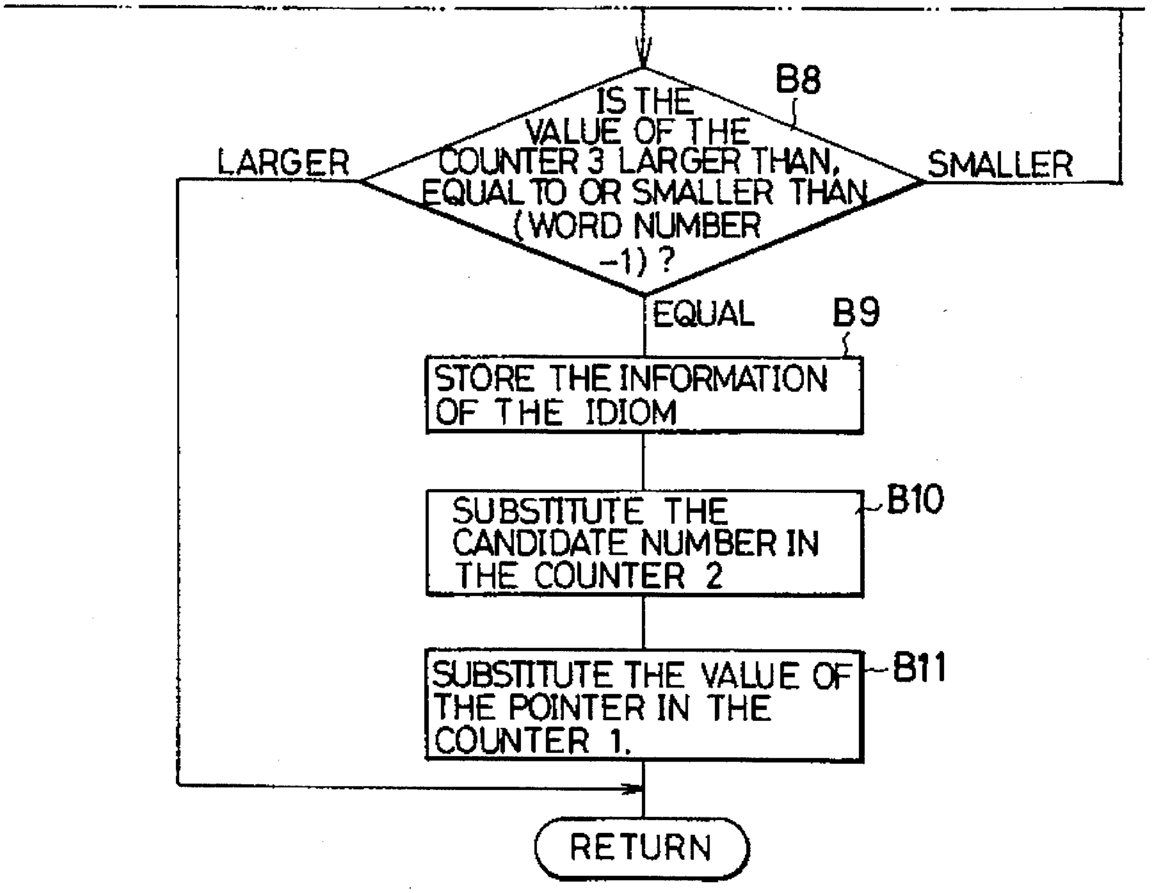

Fig. 40 a bit of
a few
:
:
ahead of
all the time
all [the|_] year round
all too
and so on
:
:
away from

Fig. 41

| 1 | 2 | 3 | 4 | 5 | 6 |
|---|---|---|---|---|---|
| Japanese | people | work | all | year | round |

Fig. 42

| | 0 | 1 | 2 | 3 |
|---|---|---|---|---|
| 1 | all | the | time | |
| 2 | all | [the_] | year | round |
| 3 | all | too | | |

Fig. 43

| | |
|---|---|
| ENGLISH WORD | all year round |
| PART OF SPEECH | ADVERB |
| TRANSLATED WORD | 一年中 |
| PART OF SPEECH | THE OTHER |

Fig. 44C(ii)
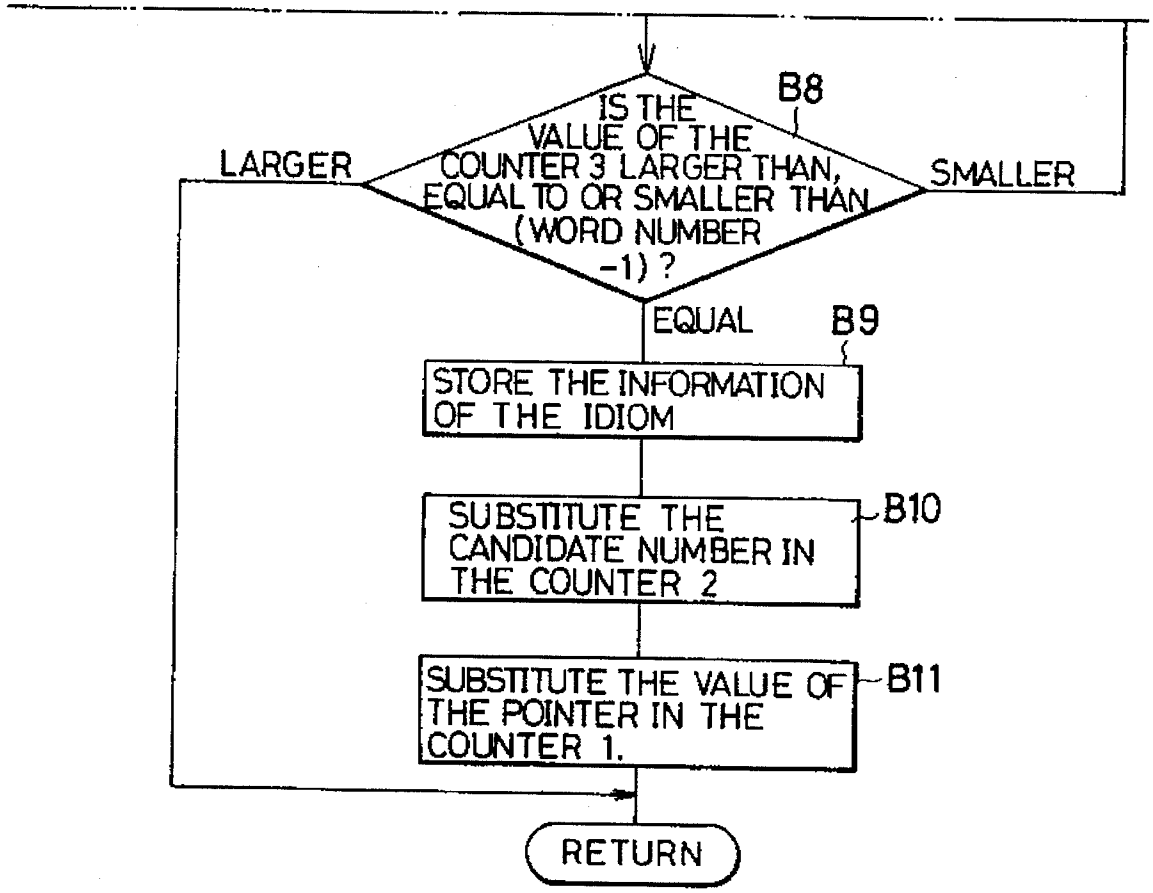

Fig. 45

| | |
|---|---|
| ENGLISH WORD | behant of [in\|on] |
| LOCATION INFORMATION | 0  0  1 |
| PART OF SPEECH | ADVERB |
| TRANSLATED WORD | のために |
| PART OF SPEECH | THE OTHER |

Fig. 46

| 1 | 2 | 3 | 4 | 5 | 6 |
|---|---|---|---|---|---|
| I | work | in | behalf | of | her |

Fig. 47

| 0 | 1 | 2 | 3 |
|---|---|---|---|
| 1<br>LOCATION INFORMATION | behalf<br>0 | of<br>0 | [in\|on]<br>1 |

Fig. 48

| | |
|---|---|
| ENGLISH WORD | in behalf of |
| PART OF SPEECH | ADVERB |
| TRANSLATED WORD | のために |
| PART OF SPEECH | THE OTHER |

TRANSLATION MACHINE HAVING CAPABILITY OF REGISTERING IDIOMS

BACKGROUND OF THE INVENTION

1. Field of the Invention

The present invention relates to the translation machine which provides an electronic dictionary. More particularly, the invention relates to a translation machine which provides a capability of registering idioms and retrieving or translating the registered idioms.

2. Description of the Related Art

A commercially available language processing apparatus includes a wordprocessor for aiding in creating a document or a translation machine for translating a document written in a language into the translated counterpart written in another language. Such a language processing apparatus provides some purpose-specified dictionaries. What is meant by the term "dictionary" is arranged to systematize a header word and the information about the header word as one item and for an operator to easily retrieve a desired item with the header word.

The dictionary is recorded on a nonvolatile medium in a machine-readable format. Such a dictionary is referred to as an electric dictionary. When using the electric dictionary in doing machine translation, a word train (containing only one word) of a source language is used as a header word. The information accompanied with the header word contains parts of speech about the word train and a translated counterpart (target language) of the header word.

The known translation machine providing the electronic dictionary is normally arranged to display a translated word when an operator inputs a header word or a translated sentence when he or she inputs a sentence.

If a document to be processed by such a language processing apparatus contains a word not described as a header word in the electric dictionary, the working efficiency is remarkably made lower. As more header words the electronic dictionary have, more preferably the dictionary is. Likewise, for the machine translation, idioms of the original language may be registered together with words of the target language. As the electronic dictionary has more pairs of the word or idiom and its translated counterpart, the translating efficiency is made higher. The idiom is composed of a normally variable part and a fixed part. The variable part is, for example, "A" or "B" in the idiom of "from A to B" and the fixed part is the words of "from" and "to".

For example, however, to register an idiom as a header word, the following disadvantage may take place. Many idioms contain variable parts such as a numeral, a possessive pronoun, and a reflexible pronoun. Those parts may be variable in light of the subject and the other transformed word. To enhance the translating efficiency, two or more transformed idioms, each of which has different concrete words at the variable parts and the same fixed part, have to be registered as individual idioms. The registration of these idioms may put heavy burden on an operator for registering the electric dictionary. Further, as the header words are increased in number, the required storage medium of the dictionary is increased accordingly. Hence, such a registering method is not preferable.

To avoid increase of storage capacity of a dictionary, for example, a representative symbol for one word to be replaced with the variable part in the idiom is derived for the purpose of reducing the idioms to be registered in number.

As such a representative form of the variable part, if an idiom has just one variable word which has a unique part of speech, it is relatively easy to register or retrieve it. In some idioms, however, two or more variable parts may be contained or two or more parts of speech such as an adjective or an adverb may correspond to the variable part and a word train (phrase) may correspond to the variable part.

To register such an idiom having various representative forms, if a representative symbol is derived for each word of the variable part, the number of idioms to be registered is increased. This may put heavy burden on the registering operation, which may not lead to reduction of storage capacity.

In the case of building an electronic dictionary such as a fundamental dictionary or a user dictionary to be used in the known translation machine, the header word or its translated word is an idiom containing a variable part of speech such as a numeral, a noun, or an adjective, the variable part is replaced with a pre-defined special symbol when the idiom is registered. The replaceable words are limited as a specific group such as a noun, an adjective, and an adverb predefined in the system.

To register a weight unit group or a currency unit group, the operator has to write a component of a group to be used in the idiom one by one. It means that all the components has to be registered for registering one idiom.

For example, to translate the idiom of "be quoted at currency unit + figure" into the Japanese counterpart, all the possible currency units "¥", "US$", "A$", "C$", "HK$", "£", "DM", "FFr" and "SFr" has to be registered one by one such as "be quoted at ¥*m", "be quoted at US *m" and "be quoted at A$*m". "*m" used herein is a special symbol standing for a numeral. "*N" is a special symbol standing for a noun phrase.

In place, it is possible to use a part-of-speech group prepared in the system for registering such a unit without registering components one by one. For example, a group referred to as a noun phrase of a currency unit + figure is used for registering. In the above example, the phrase of "be quoted at *N" is registered. Assuming that a sentence of "The string should be quoted at need." is inputted, the word "need" is a noun and thus "at need" is made to be a noun phrase. This case is interpreted as "be quoted at *N". In this case, the idiom is not "be quoted at" but "at need". That is, this sentence has to be translated as "The string should be quoted/at need."

Further, consider registration of the idiom "at that moment". On the other hand. "at the moment" is also an idiom having the substantially same meaning. These two idioms have to be registered one by one though both have the substantially same meanings. Moreover, if the operator would like to register an idiom and its synonyms or an idiom and its antonyms as one group, for an idiom of "a majority of", an antonymous idiom of "a minority of" cannot be registered with it. If the operator would like to register some idioms as one; group, they cannot be registered at one time. They have to be registered one by one.

In the case of building the known electronic dictionary used in a fundamental dictionary or a user dictionary, when registering an idiom consisting of two or more words, even if each word may be varied, all the variations have to be registered one by one.

The foregoing known translation machine has a problem that it takes a long time to register an idiom in a dictionary and the using efficiency of the memory is worse. When specifying a large category such as a noun phrase in a variable part of the idiom, the proper translated counterparts of some inputted sentences cannot be obtained.

It is a first object of the present invention to provide a translation machine which has such a capability of registering an idiom as standing for a variable part in an idiom by a symbol or easily registering or retrieving an idiom if two or more variable parts are contained in the idiom or a word or a phrase is put in the variable part, thereby preventing reduction of a registering time, reduction of translating work or increase of storage capacity.

It is a second object of the present invention to provide a translation machine which is capable of efficiently using the memory, reducing a time in registering an idiom, and specifying a group sharing a certain feature in a variable part of the idiom, for enhancing the translating accuracy.

It is a third object of the present invention to provide a translation machine which provides such an idiom registering capability as registering two or more idioms as one idiom group.

SUMMARY OF THE INVENTION

In carrying out the first object, a translation machine comprising: input means for inputting a character string and a symbol; means for registering a header word and a translated counterpart of an idiom, the registering means having one or more representative symbols for standing for a set of words or word trains sharing a predetermined attribute and a set of words or word trains sharing two or more attributes in a compound format of the representative symbols; means for storing an idiom and a dictionary required for the translating process and a processed result; dictionary lookup and morphological analyzing means for breaking an inputted word train into morphemes and grammatically analyzing the morphemes; idiom translating means for identifying an inputted character string or its part with the registered header word of the idiom and generating the translated word off the character string corresponding to the identified header word of the idiom; syntactic analyzing means for analyzing syntax of the inputted sentence; syntactic transforming means for transforming the analyzed syntax of a source language into the syntax of a target language; means for generating a translated counterpart based on the syntax; and output means for outputting the generated translated counterpart.

Further, the storage means is preferably composed of a dictionary memory having grammatical rules for translating an inputted translated sentence and information for translated words, a buffer memory for storing the process up to the creation of a translated word, and an idiom registering memory for storing an idiom registered by the idiom registering means.

The dictionary lookup and morphological analyzing means is composed of a part of speech extracting unit for breaking an inputted character string and generating information about a part of speech of each word and a translated word extracting unit for generating a candidate of a translated word of each word.

The idiom translating means is composed of an idiom retrieving unit for retrieving the idiom registering memory and selecting a header word candidate of the idiom to be matched in the representative format to the broken word train, an idiom identifying part for specifying the idiom candidate which has the attribute of a representative symbol matched to the attribute of a word or a word train corresponding to the location of the representative symbol in the idiom, an idiom analyzing unit for analyzing a syntax of a word or a word train corresponding to the representative symbol and generating a syntax of an overall idiom, and an idiom translated word generating unit for generating a translated word of the idiom of an inputted word train based on the syntax of the idiom.

In operation, when registering a header word and its translated counterpart about an idiom, a pre-defined representative symbol is used for distinguishing an identified word from an attribute of the word corresponding to the variable part of the idiom. The header word and its translated counterpart of the idiom are registered in the memory for registering an idiom.

With this method, header words of two or more idioms having the same representative form and common variable parts are allowed to be registered as one header word.

The inputted character string is broken into words. One of the header word candidates is specified only if part of the broken word train may coincide with the representative format. Then, it is checked whether or not an attribute of the word or word train located at the representative symbol contained in the header word is matched to the attribute of the representative symbol. If matched, the idiom is specified.

Further, the syntax of the word or the word train corresponding to the representative symbol of the idiom is analyzed. Based on the transforming relation of the words, the translated counterpart of the part corresponding to the inputted character string is generated. Further, if the representative symbol corresponding to the center of the idiom is specified, the part of speech meaning this representative symbol is referred for generating the translated word.

Next, the syntax of the overall inputted character string is analyzed. Based on the transforming relation among the words, the translated words of the overall character string are created. Then, the auxiliary words are added to the translated words for completing the translated sentence.

As described above, since a variable part of an idiom is represented by a representative symbol, even if two or more variable parts are contained in the idiom or a word as well as a phrase is in the variable part, the idiom may be easily registered and retrieved so as to generate a proper translated sentence of an inputted sentence containing an idiom.

By specifying a representative symbol corresponding to the center word for standing for a part of speech of an overall idiom, the idiom may be simply registered and a proper translated counterpart of the inputted sentence containing an idiom can be generated.

In carrying out the second object, a translation machine includes; means for registering a group of words or word trains sharing a certain feature in a classifying table; means for registering a header and a translated wood of an idiom with a special symbol standing for the group; means for identifying a word train of an inputted original sentence with the header of the idiom registered by the idiom registering means; and means for outputting a translated word corresponding to the identified header of the idiom.

In operation, the first registering means operates to register an idiom with a train symbol indicating two or more words by a specific train. The first identifying means operates to identify an idiom contained in an inputted original sentence and a header word of an idiom containing a registered train symbol. The outputting means operates to output the translated word for a matched word in the train symbols when a translated word is written in the translated word corresponding to the header word of the identified idiom by a train symbol. The second registering means operates to register an idiom having a predetermined variable word. The second identifying means operates to identify an idiom and an inputted sentence registered by the second registering means.

In carrying out the third object, a translation machine provided with an idiom registering unit, the idiom registering unit includes: first registering means for registering an idiom of two or more words with a column symbols; first identifying means for identifying an idiom contained in an inputted original sentence with a header of the registered idiom having column symbols; output means for outputting a translated word for a matched word in the column symbols when the translated word for a header of an idiom identified by the first identifying means is written by the column symbols; second registering means for registering an idiom containing a predetermined variable word; and second identifying means for identifying an idiom registered by the second registering means with the inputted sentence.

In operation, the group registering means operates to register in a classifying table a group consisting of words or word trains each sharing a feature. The idiom registering means operates to register an idiom header and its translated counterpart by using a special symbol standing for a group. The identifying means operates to identify the word train of an inputted original sentence and an idiom header registered by the idiom registering means. The translated word output means operates to output the translated word corresponding to the identified idiom header.

Further objects and advantages of the present invention will be apparent from the following description of the preferred embodiment of the invention as illustrated in the accompanying drawings.

BRIEF DESCRIPTION OF THE DRAWINGS

FIG. 6 is a view exemplarily showing the stored content of a buffer A;

FIG. 7 is a view exemplarily showing the stored content of a buffer B;

FIG. 10 is a view exemplarily showing the stored content of a buffer E;

FIG. 11 is a view showing a representative symbol table used for registering an idiom;

FIG. 12 is a view showing an idiom registered with a representative symbol shown in FIG. 11;

FIG. 13 is a view showing an idiom registered with a representative symbol shown in FIG. 11;

FIG. 14 is a view showing an idiom registered with a representative symbol shown in FIG. 11;

FIG. 15 is a view showing an idiom registered with a representative symbol shown in FIG. 11;

FIG. 16 is a view showing an idiom registered with a representative symbol shown in FIG. 11;

FIG. 18 is a view showing grammatical rules used for syntactic analysis;

FIG. 19 is a view showing part of the content of a part-of-speech buffer generated after the dictionary lookup is done about the inputted sentence;

FIG. 20 is a view showing a content of an idiom buffer storing a corresponding relation between the representative symbols of the idiom and words;

FIG. 21 is a view showing another content of an idiom buffer storing a corresponding relation between the representative symbols of the idiom and a word;

FIG. 22 is a view exemplarily showing an example of registering information about an idiom of an inputted sentence which is successfully matched to the idiom;

FIG. 23 is a view exemplarily showing the result generated after the translation of an idiom is terminated and the dictionary lookup is done for all the inputted sentence;

FIG. 24 is a view showing a special symbol table used for registering an idiom;

FIG. 25 is a view showing a currency unit table;

FIG. 26 is a view showing a weight unit table;

FIG. 27 is a view showing a conveyances table;

FIG. 28 is a view showing an idiom registered with a special symbol shown in FIG. 24;

FIG. 29 is a view showing an idiom registered with a special symbol shown in FIG. 24;

FIG. 30 is a view showing an idiom registered with a special symbol shown in FIG. 24;

FIG. 32 is a view showing a content of a part-of-speech buffer after dictionary lookup about the inputted sentence;

FIG. 33 is a view showing a content of an idiom buffer storing a corresponding relation between the special symbols of the idiom and a word;

FIG. 34 is a view exemplarily showing an example of registering information about an idiom of an inputted sentence which is successfully matched to the idiom;

FIG. 35 is a view exemplarily showing the result generated after the translation of an idiom is terminated and the dictionary lookup is done for all the inputted sentence;

FIG. 36 is a view showing the registering form of an idiom in the translation machine according to a third embodiment;

FIG. 37 is a view showing the registering form of an idiom in the translation machine;

FIG. 38 is a view showing the registering form of an idiom in the translation machine;

FIG. 40 is an explanatory view showing English word headers of idioms registered by the translation machine shown in FIG. 36;

FIG. 41 is an explanatory view showing number-added correspondence between an inputted sentence and the component words through the effect of the translation machine shown in FIG. 36;

FIG. 42 is an explanatory view showing part of an idiom candidate list provided in the translation machine;

FIG. 43 is an explanatory view showing a stored example of an idiom which is successfully matched by the translation machine;

FIG. 45 is an explanatory view showing an idiom registered as rearranged words in the translation machine;

FIG. 46 is an explanatory view showing number-added correspondence between the inputted sentence and component words in the translation machine;

FIG. 47 is an explanatory view showing an idiom candidate list in the translation machine; and FIG. 48 is an explanatory view showing a stored form of an idiom which has been successfully matched in the translation machine.

DESCRIPTION OF THE PREFERRED EMBODIMENTS

Figure 1:
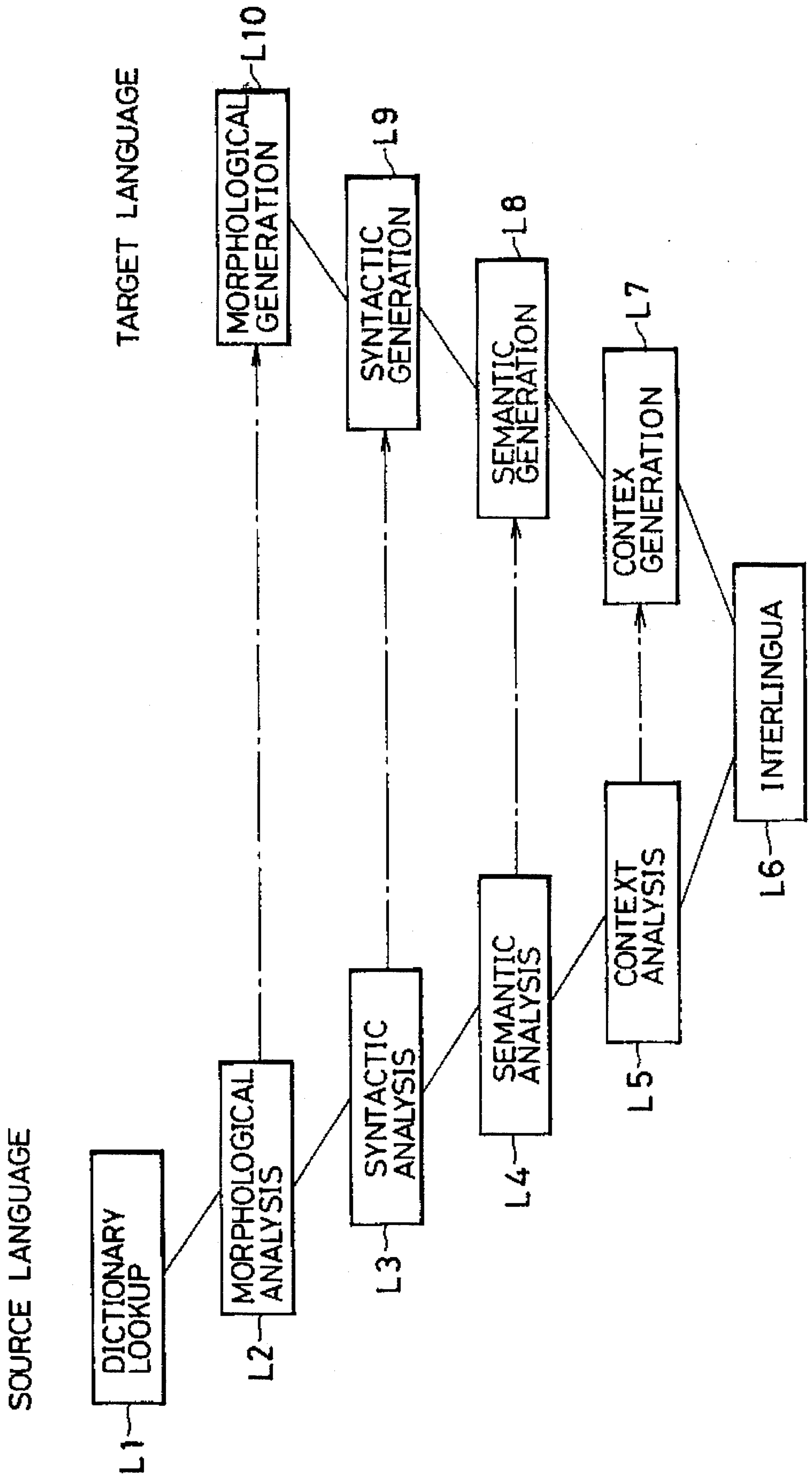
FIG. 1 is a view exemplarily showing the concept of machine translation.

Later, the invention will be discussed in detail along the embodiments as referring to the drawings. The following embodiments do not define the present invention.

Before describing the embodiments, the concept of machine translation will be briefly described. As referring to FIG. 1, analyzing process to be done in the machine translation includes various analyzing levels. In the machine translation, when a sentence written in a source language is inputted, the processes at the levels located as viewed in the left hand are sequentially performed for obtaining a sentence of a target language as indicated in the right hand of FIG. 1. For example, when a sentence of the source language is inputted, the processes are advanced in the sequence of a dictionary lookup process at the level L1, a morphological analyzing process at the level L2, a syntactic analyzing process at the level L3 and so forth. At last, the morphological generating process at the level 10 is performed for creating the counterpart of the target language.

The machine translation is largely divided into two depending on how far the analysis is advanced. At first, a pivot system machine translation may be referred. The pivot system is arranged to analyze the sentence of the source language into an interlingua indicated by the level L6 and generate the target language through the effect of the process from the level L6 up to the process at the level 10. At second, a transfer system machine translation may be referred. The transfer system is arranged to progress the analysis up to any one of the levels L2 to L5 and obtain the syntax of the source language and transform the syntax of the source language at the level into that of the target language.

The interlingua used in the pivot transfer is a concept not depending on the source language or the target language. Hence, if one analyzing process of a source language is done for obtaining an interlingua, two or more languages can be created from the interlingua. This is advantageous in doing translation among three or more languages. However, the unsolved problem involved in the pivot system is placed on whether or not the interlingua corresponding to the fundamental concept can be actually set.

The transfer system is a compromise to this unsolved problem of the pivot system. Currently, many systems use this transfer system. Later description concerns with the transfer system.

Then, the description will be oriented to the content of each analysis process shown in FIG. 1.

(1) Dictionary Lookup and Morphological Analyzing Process

In this process, an inputted sentence is divided into a morpheme train (word train) by using the longest matching method as referring to a dictionary containing morphemes. Then, the grammatical information and the translated counterpart about each analyzed word are obtained. The morpheme train is further analyzed for deriving its tense, person and number.

(2) Syntactic Analysis

In this process, based on the part of speech and the conjugated form, the syntax of the sentence such as transformation of the words is built and defined. This process does not determine whether or not the syntax stands for its proper meaning.

(3) Semantic Analysis

From two or more parsing trees obtained as a result of analyzing the syntax, a correct or an incorrect tree can be determined in light of meaning. Only the correct ones are employed.

(4) Context Analysis

This process is executed to understand the topic of the inputted sentence and clarify an omitted part or an ambiguous part contained in the inputted sentence.

Then, the description will be oriented to a translation machine according to an embodiment of the present invention.

Figure 2:
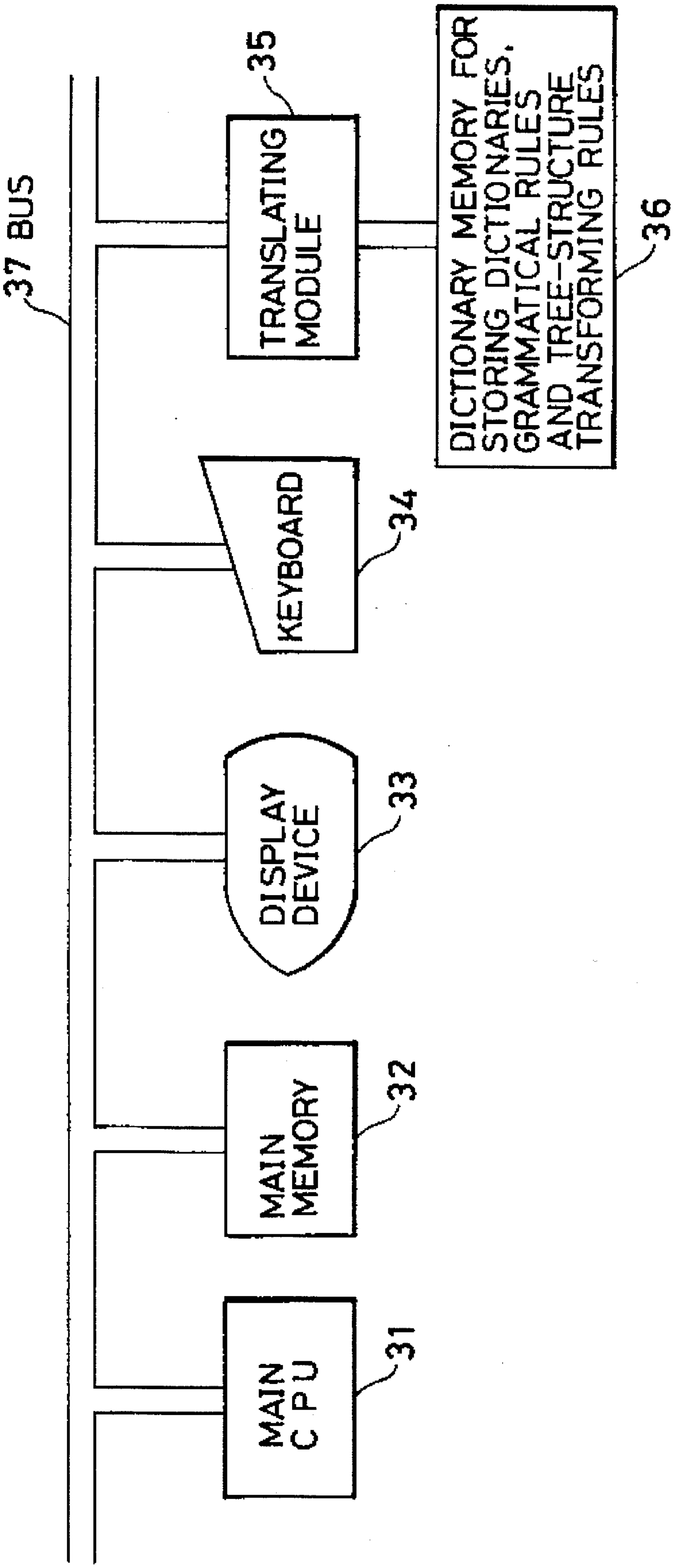
FIG. 2 is a block diagram showing a translation machine providing a dictionary retrieving unit according to the present invention.

As shown in FIG. 2, the translation machine is arranged to have a main CPU (central processing unit) 31, a bus 37 connected to the main CPU 31, a main memory 32 connected to a bus 37, a display device 33, a keyboard 34, a translating module 35, and a dictionary memory 36. The components 31 to 35 are all connected through the bus 37. The display device 33 may be a CRT or a LCD. The dictionary memory 36 is connected to the translating module 35 and stores a knowledge base such as a translation dictionary, grammatical rules and tree-converting syntax rules.

The translating module 35 operates to translate a sentence written in the source language into the translated counterpart through the predetermined procedure.

Figure 3:
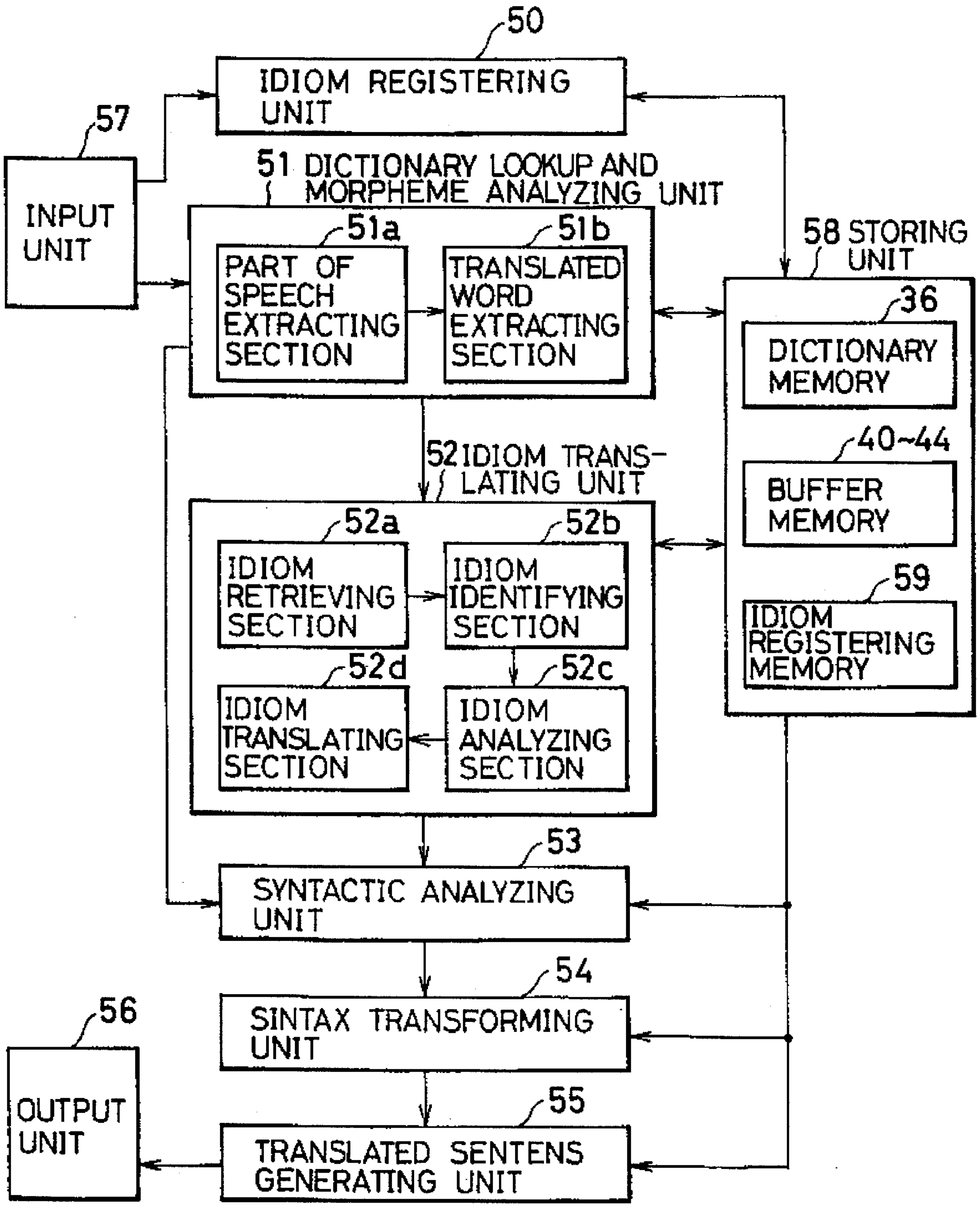
FIG. 3 is a block diagram showing an arrangement of a dictionary retrieving unit shown in FIG. 2.

FIG. 3 shows a functional block diagram of the translation machine of the embodiment. As shown in FIG. 3, a translation machine comprises: input unit 57 for inputting a character string and a symbol; idiom registering unit for registering a header word and a translated counterpart of an idiom, the registering unit having one or more representative symbols for standing for a set of words or word trains sharing a predetermined attribute and a set of words or word trains sharing two or more attributes in a compound format of the representative symbols; storing unit for storing an idiom and a dictionary required for the translating process and a processed result; dictionary lookup and morphological analyzing unit 51 for breaking an inputted word train into morphemes and grammatically analyzing the morphemes; idiom translating unit 52 for identifying an inputted character string or its part with the registered header word of the idiom and generating the translated word of the character string corresponding to the identified header word of the idiom: syntactic analyzing unit 53 for analyzing syntax of the inputted sentence; syntactic transforming unit 54 for transforming the analyzed syntax of a source language into the syntax off a target language; translated sentence generating unit for generating a translated counterpart based on the syntax: and output unit 56 for outputting the generated translated counterpart.

Further, the storage unit 58 is composed of a dictionary memory 36 having grammatical rules for translating an inputted translated sentence and information for translated words, a buffer memory 40 to 44 for storing the process up to the creation of a translated word, and an idiom registering memory 59 for storing an idiom registered by the idiom registering unit 50.

The dictionary lookup and morphological analyzing unit 51 is composed of a part of speech extracting section **51*a* for breaking an inputted character string and generating information about a part of speech of each word and a translated word extracting section 51*b*** it for generating a candidate of a translated word of each word.

The idiom translating unit 52 is composed of an idiom retrieving section 52 for retrieving the idiom registering memory and selecting a header word candidate of the idiom to be matched in the representative format to the broken word train, an idiom identifying section **52*b* for specifying the idiom candidate which has the attribute of a representative symbol matched to the attribute of a word or a word train corresponding to the location of the representative symbol in the idiom, an idiom analyzing section 52*c* for analyzing a syntax of a word or a word train corresponding to the representative symbol and generating a syntax of an overall idiom, and an idiom translated word generating section 52*d*** it for generating a translated word of the idiom of an inputted word train based on the syntax of the idiom.

The translating module 35 in the FIG. 2 is constructed from the units 51 to 55.

Figure 4:
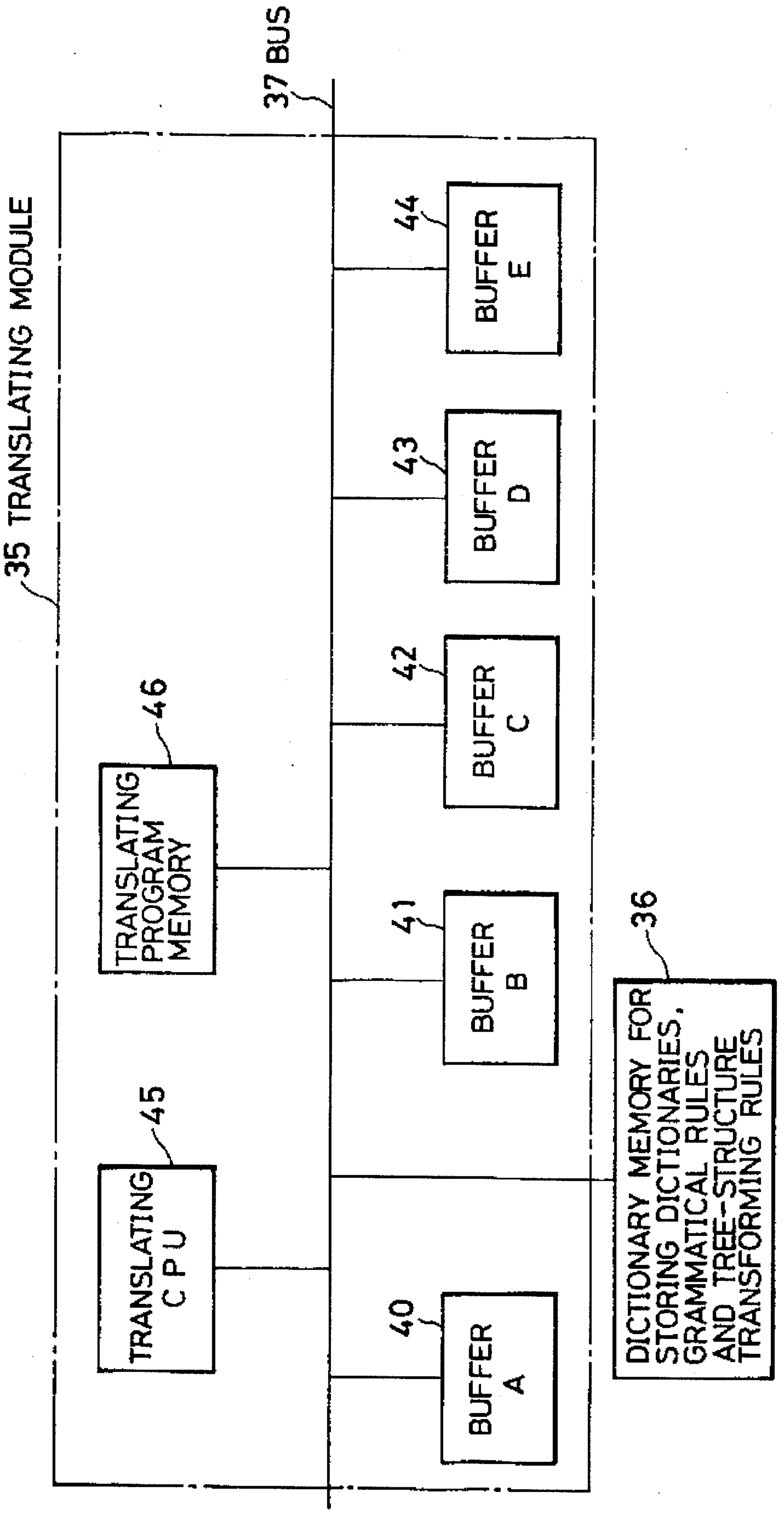
FIG. 4 is a block diagram showing a translating module 35 shown in FIG. 2.

FIG. 4 is a block diagram showing the circuitry of the translating module 35.

The translating module 35 is arranged to have a translating CPU 45, a translating program memory 46, and buffers A 40 to E 44. The translating CPU 45 operates to translate an inputted sentence of the source language into the translated counterpart of the target language according to the predetermined translating program and output the result onto the bus 37. The translating program memory 46 stores the translating program to be executed by the translating CPU 45. The buffer A 40 stores each of the words of an original sentence of the source language. The buffer B 41 stores the information such as a part of speech about each word and its translated counterpart, which are obtained by referring to the dictionary contained in the dictionary memory 36. The buffer C 2 stores information about a parsing tree of the source language. The buffer D 43 stores a parsing tree of the target language, which is transformed from the parsing tree of the source language stored in the buffer C 42. The buffer E 44 stores a complete sentence of the target language by supplementing the parsing tree of the target language stored in the buffer D 43 with proper particles or auxiliary verbs.

In the translating module having the foregoing arrangement, the analysis is advanced up to the level L3 as shown in FIG. 1.

Figure 5:
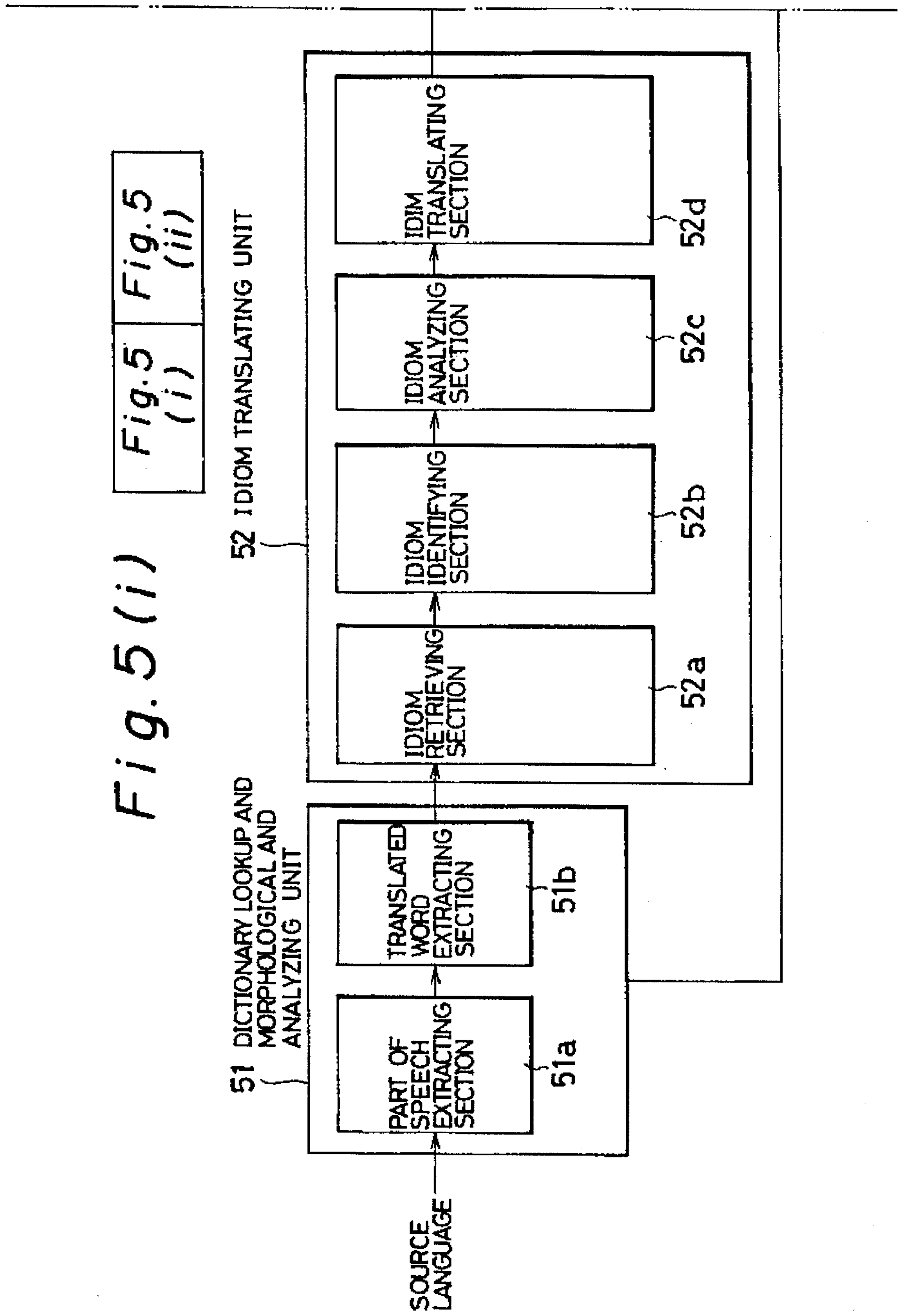
FIG. 5 is a flowchart showing a process from analysis of an inputted sentence to generation of a translated counterpart in the translating module.
Figure 8:
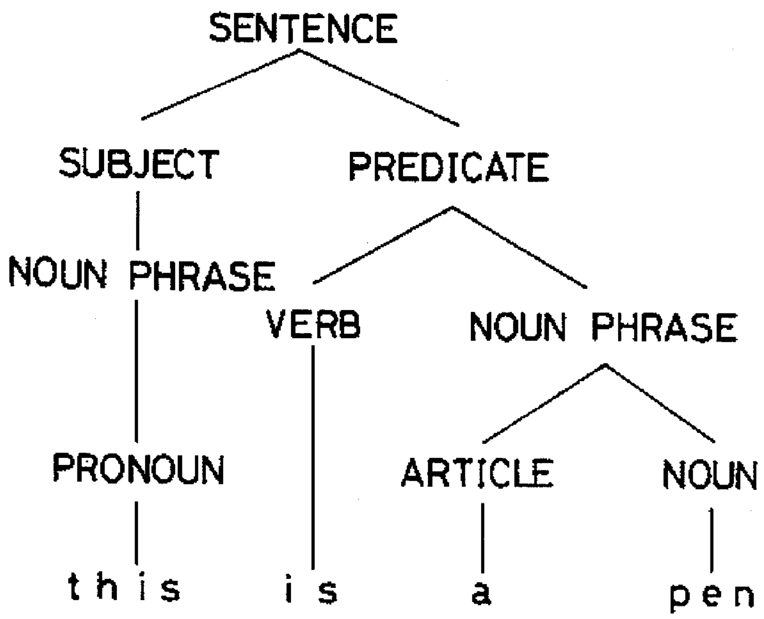
FIG. 8 is a view exemplarily showing the stored content of a buffer C.
Figure 9:
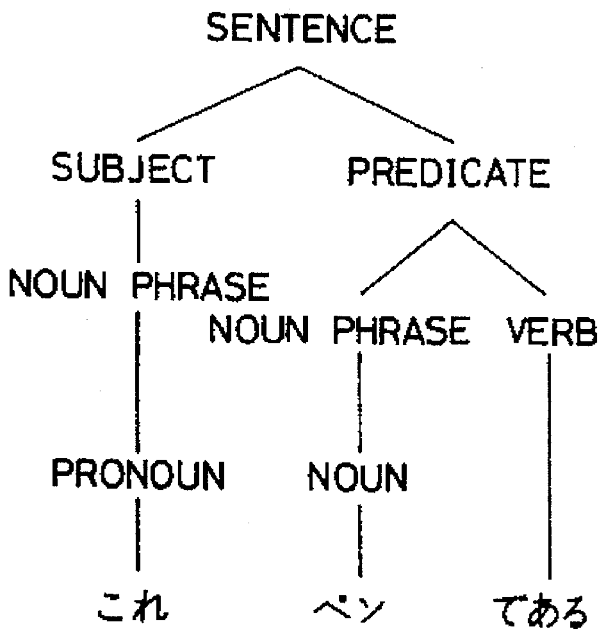
FIG. 9 is a view exemplarily showing the stored content of a buffer D.

FIG. 5 shows the processing structure of the translating module 35.

As shown in FIG. 5, a numeral 51 denotes a dictionary lookup and morphological analyzing unit for performing a dictionary lookup and morphological analyzing process with respect to a sentence written in the source language. A numeral 52 denotes an idiom translating unit for identifying and analyzing an idiom if any and generating its translated counterpart. A numeral 53 denotes a parsing tree for performing syntactic analysis with respect to an inputted sentence analyzed into morphemes. A numeral 54 denotes a syntax transforming unit for transforming the analyzed syntax and generating the parsing tree of the target language. A numeral 55 denotes a translated sentence generating unit for generating a translated sentence of the target language based on the parsing tree of the target language created by the syntax transforming unit 54.

The dictionary lookup and morphological analyzing unit 51 is composed of a speech part extracting section **51*a* and a translated word extracting section 51*b*. The extracting section 51*a* operates to break an inputted character string into words and the extracting section 51*b*** operates to create the translated word candidates of each word.

The idiom translating unit 52 is composed of an idiom retrieving section **52*a*, an idiom identifying section 52*b*, an idiom analyzing section 52*c*, and an idiom translating section 52*d*. The idiom retrieving section 52*a* operates to select idiom header word candidates whose representative forms may coincide with the word train broken by the dictionary analyzing and morphological analyzing unit 51 from the pre-registered idioms. The idiom identifying section 52*b* operates to specify one of the idiom candidates selected by the idiom retrieving section 52*a*. The idiom analyzing section 52*c* operates to analyze a syntax of a word train corresponding to one specified idiom and generate the overall idiom syntax. The idiom translating section 52*d* operates to generate the translated word of an idiom contained in the inputted word train based on the idiom syntax. The processes to be done in the units 51 to 55** will be discussed in detail.

Later, the description will, be oriented to the translating operation from English to Japanese to be executed in the translation machine according to the embodiment as referring to FIGS. 2 to 10. Herein, the source language is English and the target language is Japanese. At first, the translating operation will be discussed as taking an example of an English sentence "This is a pen" containing no idiom.

The original sentence is broken into morphemes. The morphemes are stored in the buffer A 40 (see FIG. 3) in the format as shown in FIG. 6.

Under the control of the translating CPU based on a program stored in the translating program memory 46, the dictionary lookup and morphological analyzing unit 51 (see FIG. 5) operates to obtain a translated word and grammatical rule of each word about an original sentence stored in the buffer A 40 by referring to the dictionary stored in the dictionary memory 36. This information is stored in the buffer B 41 as shown in FIG. 4.

The grammatical information contains a part of speech about each word. The part of speech is stored in the form shown in FIG. 7. As shown, the word "this" has two parts of speech, that is, a pronoun and an indicative adjective. The word "is" is a verb. Likewise, the parts of speech about the words "a" and "pen" are stored in the buffer B 41. Since the word "this" has two parts of speech, the syntactic analyzing unit 53 (see FIG. 5) serves to uniquely define the part of speech about "this".

In the translating program, the syntactic analyzing unit 53 (see FIG. 5) serves to define the parsing tree showing the transformation about the words according to the dictionary and the grammatical rules stored in the dictionary memory 36. The syntax analyzed result is stored in the buffer C 42 (see FIG. 3).

The parsing tree is defined as follows. Of the grammatical rules stored in the dictionary memory 36, the English grammatical rules are as follows.

| | | |
|---|---|---|
| Sentence | ——> | Subject + Predicative |
| Subject | ——> | Noun Phrase |
| Predicative | ——> | Verb + Noun Phrase |
| Noun Phrase | ——> | Pronoun |
| Noun Phrase | ——> | Article + Noun |

Of these rules, the first rule stands for "a sentence consists of a subject and a predicative." This holds true to the other rules. The parsing tree is defined according to these rules. These grammatical rules are prepared also about the Japanese. The English grammatical rules correspond to the Japanese grammatical rules, respectively.

In the translating program, the structure of the parsing tree of the inputted English sentence is transformed into the structure of the parsing tree of the Japanese sentence. In the transformation, like the syntactic analyzing unit 53, "the tree syntax transforming rules" stored in the dictionary memory 36 are used. As shown in FIG. 1, this transformation corresponds to the levels L3 to L9 of the target language. The sentence used in this description is "This is a pen." is transformed into the Japanese character string " (Kore) (Pen) (Dearu).".

The process executed in the translated sentence generating unit 55 (see FIG. 5) of the translating program is executed to add a proper particle " (ha)" and a proper adverb to the Japanese character string " (Kore) (Pen) (Dearu)". The translated sentence generating unit 55 operates to output the grammatically complete Japanese sentence shown in FIG. 10, which is stored in the buffer E 44 shown in FIG. 3. This process corresponds to the levels L9 to L10 shown in FIG. 1. The obtained Japanese sentence " (Kore) (ha) (Pen) (De) (Aru)" is outputted from the translating module 35 shown in FIG. 2. This output sentence is stored in the main memory 32 and is displayed in the display device 33.

Next, the description will be oriented to a method for registering an idiom as standing for a word or a word train as a representative symbol.

FIG. 11 shows a table having representative symbols.

This table is pre-stored in the dictionary memory 36. As shown in FIG. 11, the representative symbols may be divided into terminal representative symbols and non-terminal representative symbols. The terminal representative symbols stand for various parts of speech of words. The non-terminal representative symbols stand for various parts of speech of word trains mainly referred to as a sentence, a phrase and a clause.

FIGS. 12 to 16 show how to register an idiom.

As shown, the registered idiom is composed of an English word, its part of speech, its translated word and its part of speech, which are all stored in the dictionary memory 36.

In FIG. 12, an idiom referred to as "as A as can be" is registered by using a representative symbol. Herein, "A" stands for a word, a phrase or a sentence. In this idiom example, only one adjective corresponds to "A".

Since the representative symbol for standing for an adjective is "*a" as indicated in the representative symbol table shown in FIG. 11, it is registered in the form of "as *a as can be" in the English word row.

In the succeeding row of a part of speech, a part of speech about an idiom is registered. Since this is an adjective phrase, it has the same definition as the adjective of "*a" and is not specified. This is because though only the adjective is put into the representative symbol, if an adverb is put therein, the part of speech of an idiom is changed. For example, when an adverb is put therein, the idiom is an adverb phrase. When an adjective is put therein, the idiom is an adjective phrase. Hence, the part of speech is not specified.

Next, which of the part in the translated counterpart "a*" may correspond is made clear as in the translated counterpart "*a".

In the last part-of-speech row, a part of speech of the translated counterpart is specified. The translated counterpart is terminated by a representative symbol like "*a" and is changed as the conjugation of "*a". Hence, the part of speech is not specified. Hence, nothing is specified. The part of speech about a translated word is specified by the later process.

Next, FIG. 13 shows an idiom of [as A as B] in which "A" is an adjective and "B" is an infinitive. The adjective is represented by "*a" as shown in the representative symbol table and the infinitive is represented by "*I". Though it is registered as shown in FIG. 12, since two representative symbols are contained in the idiom, it is specified which of them is a center word. Since "*a" is the center word, a symbol of * is added as a and then is registered as [as a as *I] in the item of an English word.

In the part-of-speech row, since this idiom is an adjective phrase and coincides with "*a" of the center word, the part of speech of the idiom is not specified. The translated counterpart is [*I[:]*a]. Herein, "*I[:]" is a symbol for specifying that the infinitive is translated as a participial adjective. The last part of speech is not allowed to be written, because the end of "*a" prevents its specification as in FIG. 12.

FIG. 14 shows a registered idiom formed as [A through B]. In this idiom, since a numeral or a noun phrase is put in "A", "A" is represented by *m or *N as a representative symbol shown in FIG. 11. If two or more representative symbols correspond to "A", the symbols are collectively written as *mN. The symbols are ranged in the sequence of a terminal symbol and a non-terminal symbol. If those symbols are the same symbols, any sequence is made possible. This sequence has a relation with the sequence of the post process. The head representative symbol, herein, "m", is processed at first.

Since a numeral or a noun phrase is put in "B", it is represented by *mN like "A". To distinguish "A" from "B", figures immediately after the representative symbols are assigned like *mN1 and *mN2 when they are described. In the part-of-speech row, the part of speech of the idiom is specified. Hence, the center word is not required to be specified. In specifying the part of speech, if a numeral or a noun phrase is put in the representative symbol, it is desirous to treat the idiom as a noun phrase. Hence, the noun phrase is specified in the part-of-speech row.

In the translated word, the figures are clearly described like the English word like [*mN1*mN2]. As the final part of speech, " (the other)" is specified, because the translated word is terminated in the non-conjugated form like [~].

In FIGS. 15 and 16, the idiom of [A times as B as C] is registered. The idiom is divided into two when it is registered. When a sentence or a noun phrase comes to the part of "C", "*CN" is represented as "C". When a sentence plus adverb of a personal pronoun comes to the part of "C", "*3 *x" is represented as "C". It means the grammatical structures are different in both of the cases. Further, since both of the structures have respective number of the representative symbols, the representative symbols cannot be grasped as one. However, since the idiom is recognized to be divided into two or more when it is written, more idioms are allowed to be registered. This writing system may apply to various kinds of input sentences.

The translated word in FIG. 16 is made to be [*m *C[:]N *ad]. For *C, the idiom is conjugated as a participial adjective. For N, it is not conjugated. When specifying two or more categories, if there exists a conjugated form, these categories are specified one by one. For example, a noun phrase, an adjective phrase or an adverb phrase is put into one variable part and the adjective phrase is conjugated as a participial adjective. If the adverb phrase is conjugated as an end-form, the idiom is written as *NA[]D[:].

Figure 17:
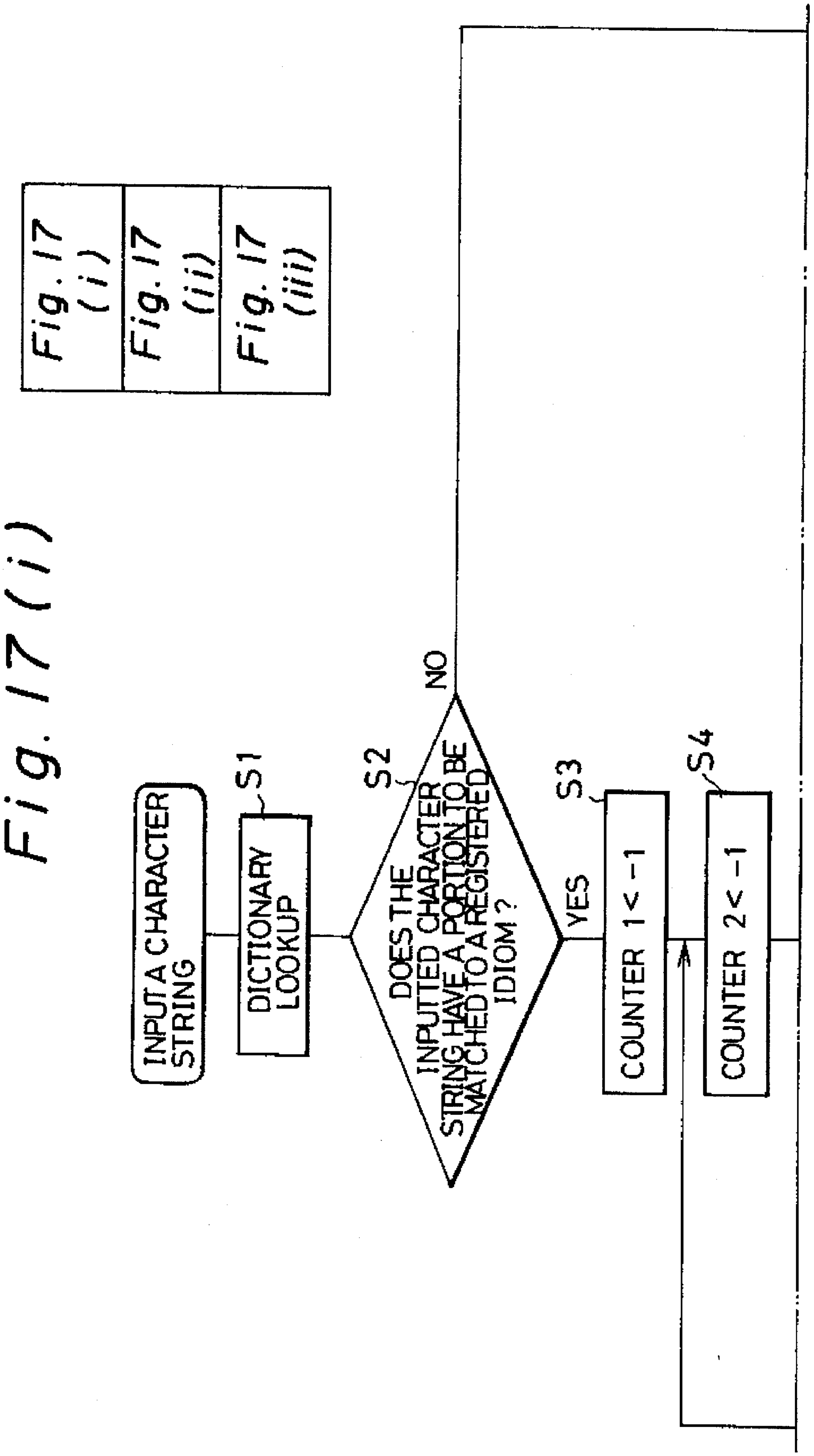
FIG. 17 is a flowchart showing a process for identifying an idiom registered with a representative symbol with an inputted sentence and outputting a translated counterpart.

Next, the description will be oriented to the process for identifying an idiom registered by representative symbols with an inputted character string and outputting a translated word as referring to the flowchart shown in FIG. 17.

The idioms shown in FIGS. 12 to 16 have been already registered in the dictionary memory 36.

FIG. 17 is a flowchart showing a process of transferring data from the identifying operation between the idioms registered as representative symbols and the inputted character string to the syntactic analyzing process.

FIG. 18 shows parts of grammatical rules, which are used at the step S6 in this embodiment. The necessary number of grammatical rules have been stored in the dictionary memory 36.

Later, the description will be expanded when a sentence of "This apple is three times as big as that orange." is inputted.

At a step S1, the dictionary is consulted. the information about a part of speech and classification is set to the part-of-speech buffer provided in the translating module 35. FIG. 19 shows how this sentence is stored in the memory provided in the part-of-speech buffer.

At a step S2, the operation is executed to refer to the representative symbol table shown in FIG. 11 and the idioms registered by using the representative symbols shown in FIGS. 12 to 16 and research whether or not each word and each part of speech in the part-of-speech buffer are matched to the registered idioms.

By viewing the part-of-speech buffer shown in FIG. 19, the words to be matched to the registered idioms are searched.

In this example, "times" in the part-of-speech buffer 5 is matched to "times" in the registered idiom as shown in FIG. 15. Next, "as" of the part-of-speech buffer 6 and "as" of the part-of-speech buffer 8 are matched to each "as" in FIG. 15. Further, since the idiom shown in FIG. 16 have "times", "as" and "as", those idioms are matched to the words in the buffer 5. Hence, this idioms shown in FIGS. 15 and 16 may be matched to the inputted sentence. Herein, the number of the generated idiom buffer is set as 2.

Further, the word, the phrase and the sentence to be replaced with the representative symbols are set to the idiom buffer. Concretely, *m of the idiom shown in FIG. 15 is "three" and "**ad" is "big". "*3" is "that", "*x" is "orange". They are all set to the idiom buffer 1 (see FIG. 19).

The idiom shown in FIG. 16 has the substantially same correspondence as shown in FIG. 15. The final *CN is "that orange". The idiom buffer 2 shown in FIG. 20 stores them. At a step S2, if no match to the idioms is done, the operation transfers to the process of analyzing the syntax at a step S14.

At a step S3, a value of a counter 1 is initialized as 1. The counter 1 is used for processing the number of the idiom buffer.

At a step S4, a value of the counter 2 is initialized as 1. This counter 2 is used for processing the number of the representative symbol in the idiom buffer.

At a step S5, it is determined whether or not the representative symbol indicated by the counter 2 of the representative symbols stored in the idiom buffer pointed by a value of the counter 1 is a terminal symbol. In this case, since the value of the counter 1 is 1, a remark is placed on the idiom buffer 1 and then a remark is further placed on the turn indicated by the counter 2, that is, the first *m. Since *m is a terminal symbol, the operation goes to a process at a step S8.

At the step S8, it is checked whether or not the representative symbol is matched to the English word. The remarked English word is "three". In the part-of-speech buffer shown in FIG. 19, the word is matched to the numeral, that is, *m of the representative symbol. Then, the operation goes to a process at the step S9.

If not matched at the step S8, the operation goes to a process at a step S80. At the step S80, it is determined whether or not the character string of the representative symbols contain non-terminal symbols. If yes, the operation goes to a process at the step S6. If no, the operation goes to a process at a step S12.

At the step S9, the value of the counter 2 is increased by 1. Since the counter 2 is 1, it is increased to 2.

At a step S10, it is determined whether or not the value of the counter 2 is larger than the number of the representative symbols in the idiom buffer. If so, it means that the representative symbols are completely matched to the candidate idioms. In the current case, since the value of the counter 2 is 2 and the number of the representative symbols in the idiom buffer is 4, the matching fails. The operation goes to a process at the step S5.

At the step S5, it is determined whether or not the marked representative symbol is a terminal symbol. At this time, the value of the counter 2 is made to 2. Hence, a remark is placed on "ad" in FIG. 15**, that is, "*ad" in FIG. 20 as a head. Since "*ad" is a terminal symbol from the representative symbol table shown in FIG. 11. the operation goes to a process at the step S8.

At the step S8, it is determined whether or not the representative symbol "**ad" is matched to the English word "big". Since the English word "big" is an adjective, it is matched to "*a" of "ad". Next, the operation goes to a process at a step S9**.

At the step S9, the counter 2 is incremented as 3. At a step S10, the determination becomes unsuccessful and then the operation returns to the step S5. At the step S5, a remark is placed on "*3". Since this is a terminal symbol, the operation goes to the step S8.

At the step S8, it is determined whether or not "that" is matched to "*3". Since the part of speech of "that" is determined to be a pronoun, a definitive or a relative pronoun by referring to the part-of-speech buffer shown in FIG. 19, the word is matched to the pronoun (subjective) indicated at *3.

Then, at the step S9, the value of the counter 2 is increased to 4. At the step S10, the determination becomes unsuccessful. Then, the operation returns to the step S5. At the step S5, a remark is placed on "*x". Since it is a terminal symbol, the operation goes to the step S8.

At the step S8, it is determined whether or not the word "orange" is matched to "*x". The part of speech of "orange" is determined to be a noun by referring to the part-of-speech buffer and "*x" is an auxiliary verb, the word "orange" is not matched to "*x". Hence, the operation goes to a process at a step S80.

At the step S80, a remark is currently placed on the representative symbol "*x", which does not contain a non-terminal symbol. Hence, the operation goes to a process at the step S12. If the remark is placed on the representative symbols containing a non-terminal symbol like *aN, the operation goes to a process at the step S6 for checking whether or not N is matched to the word.

At the step S12, the value of the counter 1 is increased by 1. Since the counter 1 indicates a value of 1, the value of the counter is increased to 2. This process is done for transferring the remarked idiom buffer to the next one.

At the step S13, it is determined whether or not the value of the counter 1 is smaller than or equal to the number of the idiom buffers. If so, it means that all the idioms to be matched with the inputted sentence are checked. The operation goes to a step S14. In the current case, since the value of the counter 1 is 2 and the number of the idiom buffers is 2, the operation returns to the step S4.

At the step S4, the value of the counter 2 is reset to 1. In the current state, the value of the counter 2 indicates 3. When the operation goes to the next process, the process is started from the third representative symbol of the idiom buffer. Hence, the value of the counter 2 is initialized as 1.

Returning to the process at the step S5, since the currently remarked first one, *m, of the idiom buffer 2 and it is a terminal symbol, the operation goes to a process at the step S8. In the subsequent process, the value of the counter 2 is made to be 3. The process to be executed until a remark is placed on the representative symbol *CN is not illustrated, because the same process as the idiom buffer is repeated.

It is assumed that the value of the counter 2 is made to 3 and the operation enters into the process at the step S5. Since the representative symbol is *CN and it is a non-terminal symbol, the operation goes to a process at the step S6.

At the step S6, the word train is analyzed into a sentence or phrase. The currently remarked one is a third English word train "that orange" of the idiom buffer 2. Then, the grammatical rules shown in FIG. 18 may apply to the part of speech information 9 and 10 about "that orange" stored in the part-of-speech buffer shown in FIG. 19.

Herein, it is recognized that "that" is DET (definitive) and "orange" is NOUN. The rule 6 may match to "that orange". That is, "that orange" is recognized as an NP (Noun Phrase).

If the syntactic analysis at the step S6 fails, at the step S61, the operation goes to a process at the steps 12. Since it is now successful, the operation goes to a process at the next step S7.

At the step S7, the translated word corresponding to the noun phrase recognized at the step S6 is created. The processes to be done herein is the same as those to be done in the syntax transforming unit 54 and the translated sentence generating unit 55 shown in FIG. 5. That is, "that orange" is translated as "".

Next, at the step S81, it is determined whether or not the representative symbol is matched to the English words. Since "that orange" is an NP (noun phrase) as shown in FIG. 11, it is matched to *N of the representative symbol *CN.

At the step S9, the value of the counter 2 is made to be 4. Then, at the step S10, the value (=4) of the counter 2 is larger than the number (=3) of the representative symbols in the idiom buffer. Hence, the operation goes to a process at the step S11.

At the step S11, the idiom matched to the inputted sentence is registered in the dictionary buffer. The information to be registered includes an English word train, its part of speech, the translated counterpart and its part of speech. "three times as big as that orange" which is a result of replacing the representative symbols of the idiom with the English words is put in the English word train. Since the center word is an adjective, the part of speech is an adjective phrase.

As the translated counterpart, the translated counterpart of each English word is replaced with the representative symbols shown in the translated word row of FIG. 16. In this case, the translated counterpart is "3". As stated above with respect of registering the idiom, the part of speech of a translated word is determined by the part of speech and conjugation of the last one of the translated words. In this case, since it is "", the part of speech is adjective. This result is shown in FIG. 22.

Next, at the step S12, the value of the counter 1 is increased by 1. The value of the counter 1 is made to be 3.

At the step S13, the value of the counter 1 is made to be 3 and the number of the idiom buffers is 2. Hence, the operation is successful. Hence, the overall process for consulting a dictionary is terminated.

The dictionary-lookup result (as shown in FIG. 23) is passed to the normal syntactic analysis done at the step S14. The later process is the same as the process done for "This is a pen." After executing the translating operation about an overall inputted sentence, at last, the Japanese sentence "" is created.

As described above, by representing two or more variable portions existing in the idiom with the representative symbols, the idiom is allowed to be easily registered and retrieved. Further, a proper translated counterpart for an inputted sentence containing an idiom can be created.

In turn, the description will be oriented to a translation machine having an idiom registering capability according to a second embodiment of the present invention. This embodiment is the substantially same as the first embodiment, except the idiom registering capability. Hence, focus is placed on the idiom registering capability.

Later, the description will be oriented to a classifying table provided in the idiom registering capability.

At first, it is assumed that a user would like to register a classifying table at a currency unit.

When registering an idiom, the necessary special symbols are added. FIG. 24 shows a table 1 listing the special symbols.

The first item is registered in the classifying table @1. The group of the classifying table is named. Since this is a currency unit, the group is named as money. Whatever name may be given to this group. Hence, the user may give any kind of name to this group.

Next, a currency unit is registered as a component of the classifying table. At last, the translated counterparts of the registered currency units are registered as well. All the registered items are listed in a table shown in FIG. 25.

To register the items of the group in the classifying table, it is not necessary to register all the (generally used) items contained in the group.

For example, to register a currency unit, it is just necessary to register what is actually necessary to translation (that is, what may appear in the sentence(s) to be translated). If it is unfavorable, the classifying table is allowed to be modified, added or deleted at any time.

As another example, FIG. 26 shows a table listing weight units (classifying table @2 weight) and FIG. 27 a table listing conveyances (classifying table @3 conveyance).

Next, the description will be oriented to how an idiom is registered with the classifying table.

For example, how to register an idiom with the classifying table (classifying table @1 money) listed in the table shown in FIG. 25 will be described.

Now, it is assumed that a currency unit and a figure are desired to be registered in the part of "~" of "be quoted at ~".

At first, as the header English word, "be quoted at @1 *m" is registered. The part of speech of an English word is a verb and the translated counterpart is "@1 *m". Since the part of speech of the last translated word is a verb, a word "verb" is written therein. These registered items are listed in the table shown in FIG. 28.

Next, how to register an idiom with the classifying table (classifying table @2 weight) listed in the table shown in FIG. 26 will be discussed. For example, the user would like to register an idiom of "~ lighter than . . . ". It is assumed that in the part of "~" of "~ lighter than . . . ", a numeral plus a weight unit is placed and in the part of " . . . ", a noun phrase is placed.

At first, in an English word row, "*m @2 lighter than *N" is registered. In a part-of-speech row, "adjective" is registered. In the translated counterpart row, "*N*m @2" is registered. In the final part-of-speech row for the translated counterpart, "adjective" is registered. The resulting registration is shown in a table of FIG. 29.

As another example, the use of conveyances (classifying table @3 conveyance) is listed in table shown in FIG. 30.

The feature about how the idiom with these special symbols is matched to the inputted sentence is in the process to be done when a special symbol with @ is contained in the header word of the idiom like @1.

As an example, consider the inputted sentence is "He is ten pound lighter than that man". How this sentence is processed will be described based on the flowchart of FIG. 31 as referring to the tables shown in FIGS. 24 to 30 and 32 to 35.

When a sentence is inputted, the dictionary is looked-up at a step P1. At the next step P2, it is determined whether or not the inputted character string may be matched to the registered idiom. If yes at the step P2, a counter 1 is set to 1 at a step P3. Then, at a step P4, a counter 2 is set to 1. At a next step P5, it is determined whether or not a head special character is a terminal symbol. If no at the step P5, the syntax of the phrase is analyzed at a step P6. At a next step S7, the phrase is transformed and created. At a next step P8, it is determined whether or not the phrase is matched to a special symbol. At a step P9, the counter 2 increments its value by 1. At a step P10, it is determined whether or not the value of the counter 2 is larger than the number of special symbol trains. If no at the step P10, the operation returns to the step P5. If yes at the step P10, the information of the idiom is recorded at a step P11. Then, at a step S12, the counter 1 increments its value by 1. At a step P13, it is determined whether or not the value of the counter 1 is larger than the number of idiom buffers. If no at the step P13, the operation returns to the step P4. If yes at the step P13, the syntax is analyzed.

If, at the step P5, it is determined that the head special character is a terminal symbol, that is, yes, at a step P14, it is determined whether or not the special character is @. If, at the step P14, the special character is not @, that is, no, at a step P15, it is determined whether or not the special symbol is contained in the special symbol table. If yes at the step P15, the operation goes to the step P9. If, at the step P15, the special symbol is not contained in the table, that is, no, it is determined whether or not the head special character contains a non-terminal symbol at a step P16. If, at the step P16, it contains a non-terminal symbol, the operation goes to the step P6. If, at the step P16, the head special symbol does not contain a non-terminal symbol, that is, no, the operation goes to the step P12.

If at the step P14, it is determined that the special character is @, that is, yes, the operation goes to the step P17. Further, if, at the step P2, it is determined that the inputted character string does not match to the registered idiom, the syntax is analyzed.

Next, the main components of each step will be discussed in detail.

Figure 31:
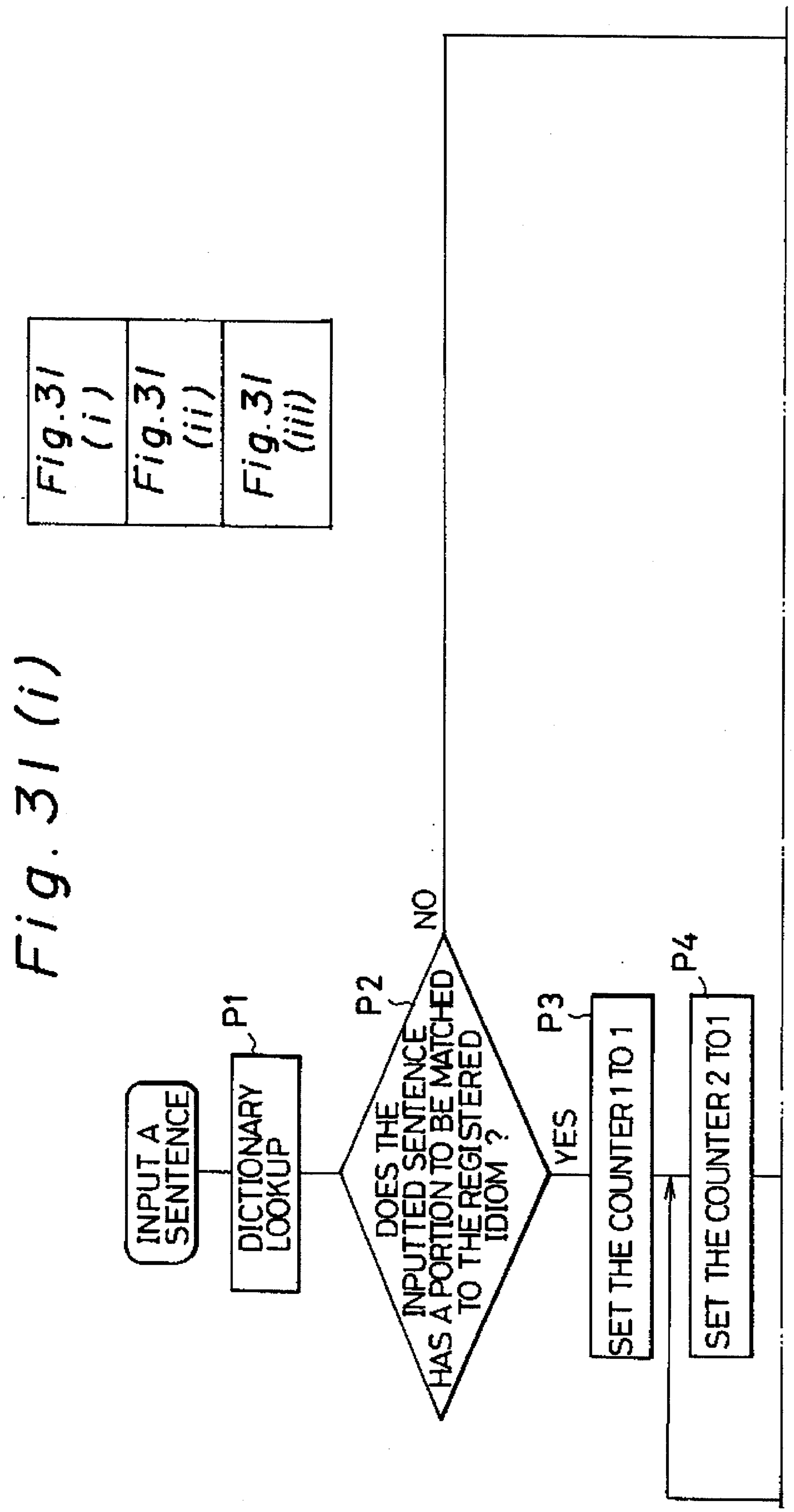
FIG. 31 is a flowchart showing an operation of a translation machine according to a second embodiment of the present invention.

At the steps P17 and P18 and P14 of the flowchart shown in FIG. 31, it is determined whether or not the special symbol is @, If it is @, it is checked whether or not the word is contained in the classifying table indicated by @, if yes, the translated word is put in @.

Table shown in FIG. 32 lists the dictionary lookup result at the step P1 of FIG. 31.

Next, the idiom listed in the table shown in FIG. 29 is referred as a candidate to be matched at the step P2 of FIG. 31. The word to be replaced with the special symbol is set to the idiom buffer. Table shown in FIG. 33 lists the replaced result.

The process from when the counter 2 indicates 2 to when a remark is placed on @2 is not described here.

Assuming that the counter 2 indicates 2 and a remark is placed on @2, at the step P14, the operation goes to the processes at the steps P17 and P18.

At the step P17, it is determined whether or not "pound" is contained in the classifying table indicated by @2. In this case, since "pound" is contained in the weight unit classifying table listed in the table shown in FIG. 26, the operation goes to the step P18.

If it is not contained in the classifying table, the candidate idiom fails to do matching. Hence, the operation goes to the step P12.

At the step P12, the process transfers to the next idiom which may match to the inputted sentence. If the candidate to be matched is contained in the table 6, at the next step P13, the determination is made successful. If no idiom to be matched exists, the operation goes to the normal syntactic analysis.

At the step P18, a proper translated word is put in the part of @2 of the translated word. From the weight unit classifying table, a translated word "" of "pound" is picked up and then is buried in @2 of the translated word of the idiom. Then, the translated word of the idiom becomes "*N*m". Then, the operation goes to the step P9.

The description about the later process will be left out. At the step P11, the information of the matched idiom is recorded. Table shown in FIG. 34 lists the recorded result.

The result listed in table shown in FIG. 35 is passed to the normal syntactic analysis.

Then, the English words are translated into the Japanese under the aforementioned translating process of "This is a pen".

In the translation machine according to this embodiment, when building an electronic dictionary, at first, a user registers in the classifying table the component words in the group he or she wants to use. For the idiom in which the header word or the translated word contains a variable portion, the registered classifying table is allowed to be specified. As compared with the known system where only the pre-defined group (often a category of a part of speech) is used, the present translation machine enables to more flexibly describe the desirous word group in the classifying table. This results in lowering the possibility of matching the subject idiom to an improper registered idiom. Further, once one group is registered, the group table may be used at any time.

In turn, the description will be oriented to a translation machine according to a third embodiment of the present invention. This embodiment is also characterized by a method for registering an idiom. Hence, the description will be oriented to the method for registering an idiom.

(1) Registering an idiom

Now, assume that "a majority of" and "a minority of" are registered. At first, consider the header English word. the words to be described in parallel are bracketed by a parallel symbol [ ] as one group with a terminating symbol | being placed between words. Concretely, the header English words are like "a [majority|minority] of".

Then, the parts of speech of them are both adjectives. Hence, their parts of speech are registered as adjectives. The translated words are registered to correspond to the header parallel word of "[|]". In the part of speech of the translated word, "the other" is registered, because they are not conjugated. The registered result about the idiom is shown in FIG. 36.

Next, "all the year round" and "all year round" are registered. For the word to be omitted, a special symbol _ is used.

At first, in the English word, the omitted word is replaced with _ like "all [the |_] year round". In addition, the special symbol _ has to be described in the last part of the bracket.

In the part of speech, since the parts of speech of them are both adverbs, they are registered as an adverb. In the translated word, both are registered as "". In the part of speech of the translated word, "the other" is registered, because the translated word is not conjugated. The result of registering the idiom is shown in FIG. 36.

At last, consider two or more groups have to be bracketed by the parallel symbols, respectively.

For example, assume that "as a result of", "as the result of" and "as the result" are registered.

In the English word, figures are added immediately after [ ] for indicating the order of the parallel symbol. Concretely, it is like "as [a|the]1 result [of|_]2".

In the part of speech, if "of" of "[of |_] 2 is selected, the idiom indicates a preposition, while if "_" (omitted) is selected, the idiom indicates an adverb. Hence, [preposition|adverb]2 is registered. In the translated counterpart, if "of" of "[of|_]" is selected, the idiom is translated as "", while if "_" is selected, the idiom is translated as "". Hence, the registered form is "[|_]2". "_" in the translated counterpart stands for omission. Further, a figure 2 immediately after [ ] used in the part of speech and the translated counterpart corresponds to a header [ ] 2. In the part of speech of the translated counterpart, since the translated counterpart is not conjugated, "the other" is registered. The registering form of the idiom is shown in FIG. 38.

In the examples shown in FIGS. 36 to 38, two words are provided in [ ]. However, two or more words may be inserted in [ ]. In addition, the number of the parallel symbols is not limited.

Next, how to match the registered idiom to the inputted sentence will be described as referring to FIG. 39A.

To simplify the description, it is assumed that only the idioms starting from "a" as shown in FIG. 40 are registered. In the idiom shown in FIG. 40, though only the English header are written, the other information such as a part of speech, a translated counterpart and a part of speech of the translated counterpart is also registered.

Now, assuming that the inputted sentence is "Japanese people work all year round", the description will be expanded below.

FIG. 41 shows figure-added correspondence between the inputted sentence and the English word.

Figure 39A:
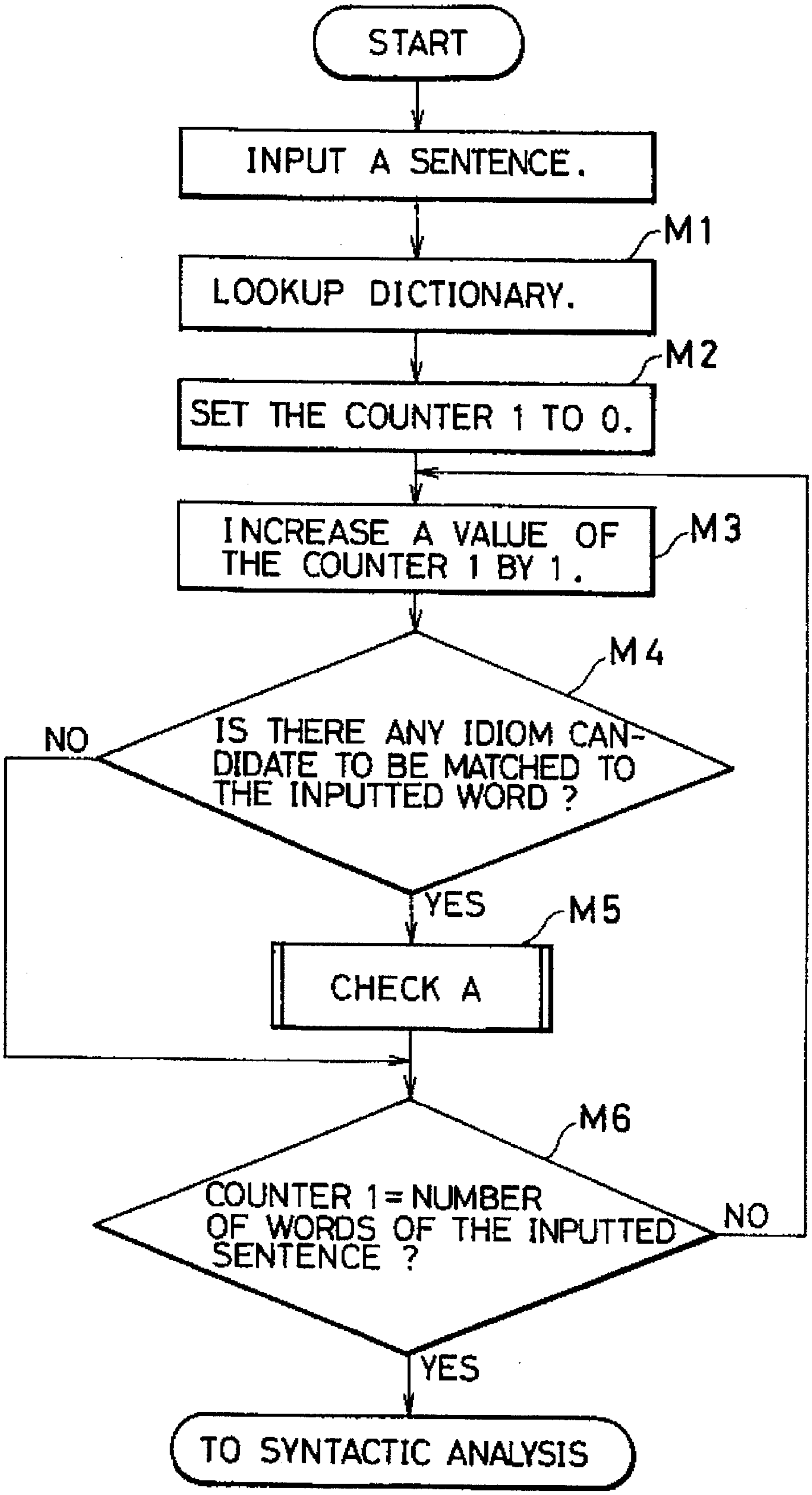
FIGS. 39A to 39D are flowcharts showing a process for identifying an idiom registered with a parallel symbol with an inputted sentence and analyzing the syntax of the sentence.

Turning to FIG. 39A, at a step M1, a dictionary is looked-up. The dictionary lookup at this step is done for one English word, not an idiom. In this flowchart, the dictionary lookup is done for the first. In place, the idiom may be checked before the dictionary lookup. Both of the operations are allowed to be done at a time.

At a step M2, a counter 1 is set to 0. This counter 1 indicates a remarked word of the inputted sentence. Since the counter 1 is set to 0, no word is remarked.

At a step M3, the counter 1 increments by 1. This is done for transferring the remark to the next word. Since the value of the counter 1 changes from 0 to 1, the remark is placed on "Japanese".

Then, at a step M4, it is checked whether or not there exists an idiom starting from the remarked word. In the current state, the registered idioms are restricted to only those starting from "a" as shown in FIG. 40. No candidate idiom matched to "Japanese" exists. Hence, the operation goes to the step M6.

At the step M6, it is checked whether or not the value of the counter 1 is equal to the number of the words of the inputted sentence. If yes, the check from the first to the last word is terminated. Since the counter 1 is set to 1 and the word number of the inputted sentence is six, the operation goes to the step M3.

In succession, at the step M3, the counter 1 increments by 1 so that the counter 1 may indicate 2. At the step M4, the remarked word is "people" and no candidate idiom to be matched to it exists. Hence, the operation goes to the step M6.

At the step M6, the counter 1 indicates 2 and the value does not coincide with 6. Hence, the operation goes to the step M3.

At the step M3, the counter 1 increments by 1 so that the counter 1 may indicate 3. At the step M4, the remarked word is "work". It means that no candidate idiom to be matched to the word is given. Hence, the operation goes to a step M6.

At the step M6, the counter 1 indicates 3 and the value does not coincide with 6. Hence, the operation goes to the step M3.

At the step M3, the counter 1 increments by 1 so that the counter 1 may indicate 4.

At the step M4, the remarked word is "all" and there exists an idiom starting from "all" in the idiom list shown in FIG.

40. Hence, the operation goes to the step M5. The operation goes to a subroutine "check A".

Figure 39B:
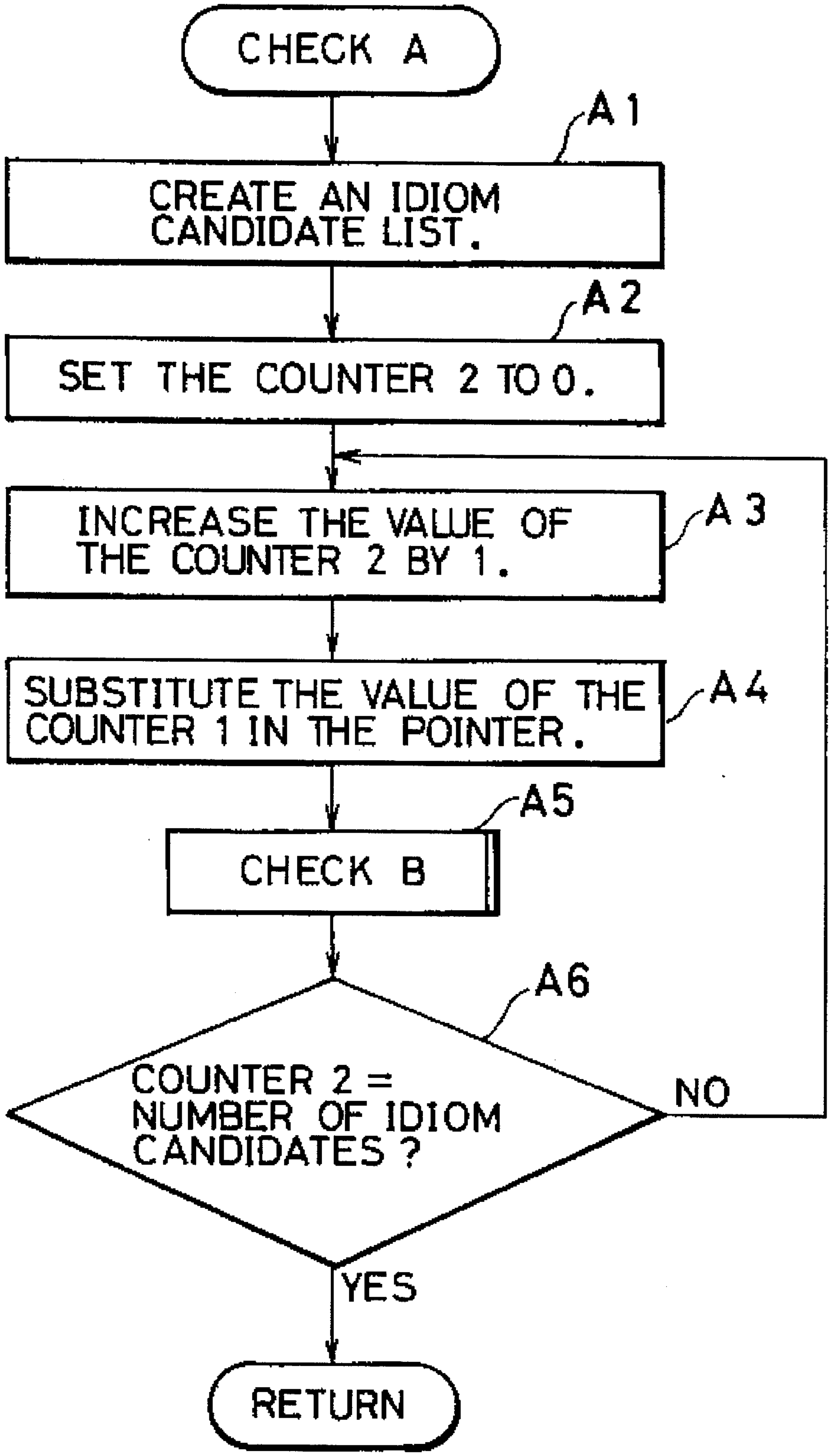

Next, the subroutine "check A" will be described as referring to the flowchart of FIG. 39B.

At a step A1, an idiom candidate list is created. In FIG. 14, the candidate idioms to be matched are "all the time", "all [the |_] year round", and "all too", which are shown in the table format in FIG. 42.

Next, at a step A2, the counter 2 is set to 0. This counter 2 indicates which of the idioms in the idiom candidate list is remarked. Since the counter 2 indicates 0, no idiom is remarked.

The counter 2 increments by 1 at a step A3. This operation is done for transferring the remark to the next idiom. Since the value of the counter 2 changes from 0 to 1, the remark is placed on "all the time".

At a step A4, a value of the counter 1 is substituted in a pointer. In this operation, as the value of the counter 1 keeps to indicate the starting location of the idiom of the inputted sentence and is copied to the pointer, matching to the candidate idiom is done by varying the value of the pointer. Since the value of the counter 1 is 4, the value of the pointer is 4.

The operation goes to the subroutine "check B" at a step A5.

Figure 39C:
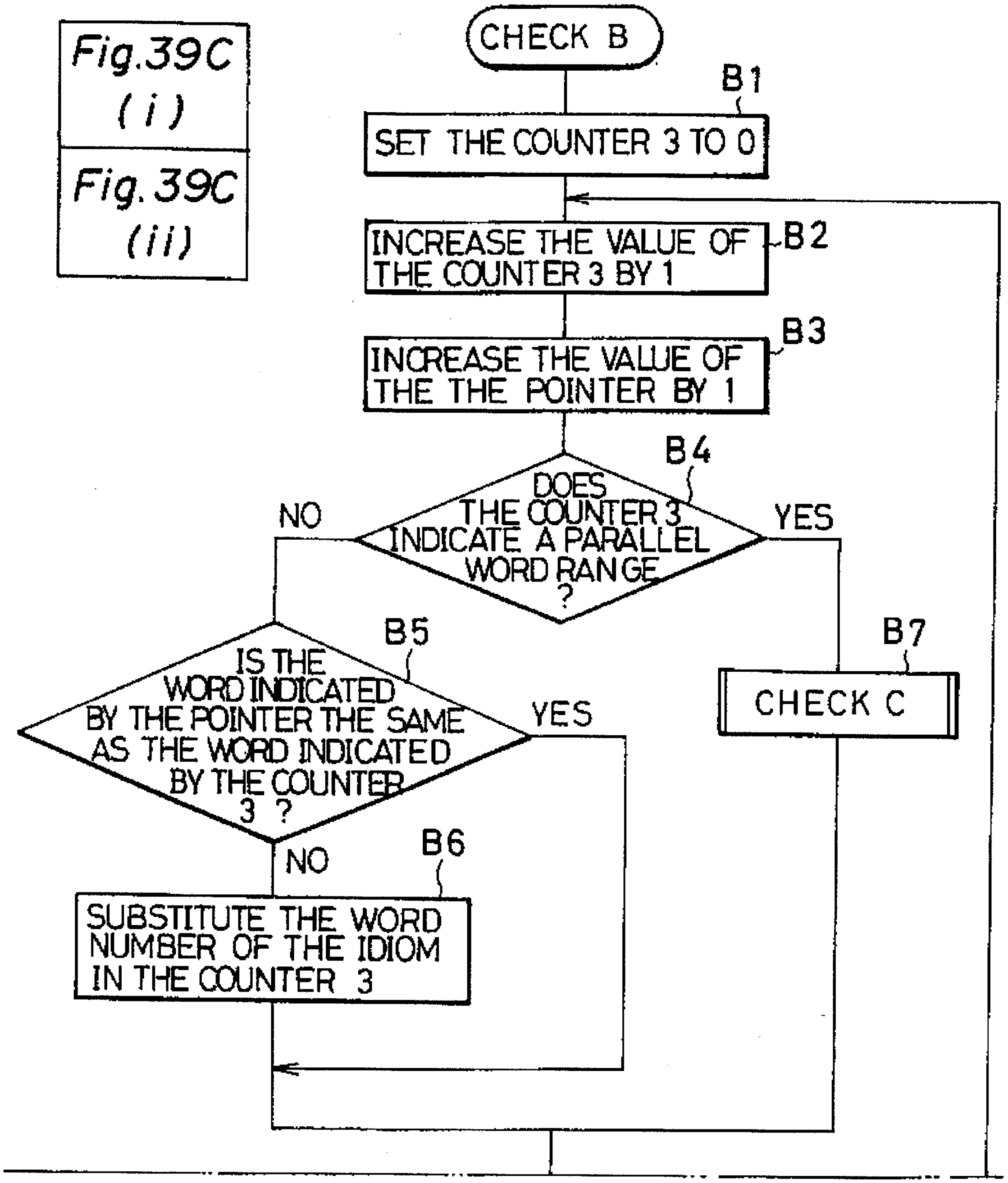

Next, as referring to the flowchart of FIG. 39C, the subroutine "check B" will be described.

At a step B1, the counter 3 is set to 0. This counter 3 indicates the number added at the top of the idiom candidate list. That is, the counter 3 indicates which of the words of the idiom is remarked. Currently, since the counter 3 indicates 0, the word "all" in the idiom "all the time" is remarked.

Then, at a step B2, the counter 3 increments by 1. This is done for transferring the remark to the next word. Since the value of the counter 8 changes from 0 to 1, the remark is placed on "the".

At a step B3, the value of the pointer increments by 1. This is done for transferring the remark from one word of the inputted sentence to the next word. Since the value of the pointer changes from 4 to 5, the remark is placed on "year".

At a step B4, it is determined whether or not the word indicated by the counter 3 is a parallel word train grouped by [ ]. Since not the parallel word train but "the" is remarked by the counter 3, the operation goes to the step B5.

At a step B5, it is determined whether or not the word indicated by the pointer is the same as the word "the" indicated by the counter 3. Now, the pointer indicates the word "year and the counter 3 indicates the word "the". It means that matching fails, so that the operation goes to a step B6.

The number of words of an idiom is put into the counter 3 at a step B6. This operation is done for providing such information as making matching to this idiom unsuccessful, because the idiom remarked by the counter 2 does not match to the input ted sentence. The value of the counter 3 is used for the determination at the next step B8. Since the number of the words of the remarked idiom "all the time" is 3, the counter 3 indicates 3.

At a step B8, it is determined if the value of the counter 3 is larger than, equal to or smaller than a length (word number) of the remarked idiom from which 1 is subtracted. This is done for determining how far matching to the remarked idiom goes. Why the value of the counter 3 is compared with one-subtracted idiom length is that the value of the counter 3 starts from 0 and is constantly smaller by 1 than the word number counted from the head. Now, since the value of the counter 3 is 3 and is larger than the value 2 given by subtracting one from three, that is, the word number of the remarked idiom "all the time". It means that matching to the remarked idiom is made unsuccessful. To remark the next idiom, this subroutine is terminated and then the process returns to the original calling side.

At a step A6, it is determined whether or not the value of the counter 2 is equal to the number of idioms in the idiom candidate list. If yes, checking all the idioms in the idiom candidate list is terminated. Now, since the value of the counter 2 is 1 and the number of the idioms in the idiom candidate list is 3, the operation goes to the step A3.

At the step A3, the value of the counter 2 is increased by 1. Now, since the value of the counter 2 changes from 1 to 2, "all [the |_] year round" is remarked.

At the step S4, a value of the counter 1 is substituted in the pointer. Since the value of the counter 1 is 4, the value of the pointer is 4.

At the step A5, the operation goes to a subroutine "check B".

At the step B1, the counter 3 is set to 0.

At the step B2, the counter 3 increments by 1. Since the value of the counter 3 changes from 0 to 1, a remark is placed on "[the |_]".

At the step B3, the value of the pointer is increased by 1, that is, from 4 to 5. A remark is placed on "year".

At the step B4, it is determined whether or not the word indicated by the counter 3 is a parallel word train. Since the word indicated by the counter 3 is "[the |_], it means the parallel word train. Then, the operation goes to the step B7.

At the step B7, the operation goes to the subroutine "check C". Then, by referring to the flowchart of FIG. 10D, the subroutine "check C" will be described.

At a step C1, the counter 4 is set to 0. This counter 4 indicates which of the words of the parallel word train grouped by [ ] is remarked. Since the value of the counter 4 is 0, no word is remarked.

The value of the counter 4 is increased by 1 at a step C2. Now, since the value of the counter 4 changes from 0 to 1, the word "the" is remarked.

At a step C3, it is determined whether or not the word indicated by the counter 4 is _. Now, since the word is "the", the operation goes to a step C4.

At the step C4, it is determined whether or not the word indicated by the counter 4 is equal to the word indicated by the pointer. Now, since the word indicated by the counter 4 is "the" and the word indicated by the pointer is "year", matching is made unsuccessful. Then, the operation goes to a step C5.

At the step C5, it is determined whether or not the value of the counter 4 is smaller than the number of the parallel word. If yes, it means that a candidate exists in the parallel word train. Then, the operation goes to the step C2. If larger than or equal to the number of the parallel words at the step C5, it means all the words in the parallel word train are checked. Hence, the operation goes to the step C6. In this case, since the value of the counter 4 is 1 and the parallel word train is "[the |_]" and the number of the words is 2 (_ is counted as one word), the operation goes to the step C2.

Herein, the operation at the step C6 will be described. When the operation goes to the step C6, it means that matching of the candidate idiom to the inputted sentence is made unsuccessful (because when the operation goes there, no word is matched after all the parallel words are checked). Hence, the word number of the idiom is substituted in the counter 3. This process is quite same as the process at the step B6.

At the step C2, the value of the counter 4 is increased by 1 and changes from 1 to 2.

At the step C3, it is determined whether or not the word indicated by the counter 4 is _. Now, since the counter 4 indicates _, the operation goes to the step C7.

At a step C7, the value of the pointer is decreased. This process is done only when the word is matched to _. Since _ stands for omission, if the pointer for indicating the words of the inputted sentence is reduced by 1, a disadvantage may take place. If the operation goes to the step B3 after the process of the step C7 is terminated and the process of some steps is terminated, the value of the pointer is increased by 1. In the current case, therefore, if the pointer is reduced by 1 at the step C7, the pointer is increased by 1 at the step B3. hence, the value of the pointer becomes six so that the word "round" may be remarked.

At a step C3, it is determined that the word is omitted. Hence, the word pointed by the pointer has to be located at the word "year". This needs to reduce the value of the pointer. In the current case, as stated above, since the value of the pointer is 5, it is reduced to 4. Then, the operation goes to the step C8.

The corresponding one to the determined word is selected from the header English word or [ ] of the translated counterpart (step C3). In the current case, since the word is matched to _ of [the |], "_" means omission. Hence, the header English word is not needed to be written to "all year round". Then, the process returns to the original calling side.

At the step B8, the value of the counter 3 is compared with the number of words minus one. Now, the counter 3 indicates 1 and the idiom remarked by the counter 2 is "all [the |_] year round". Hence, the number of the words is 4. Since the number of 4–1 is compared with the current value of the counter 3, that is, 1, the operation goes to the step B2.

At the step B2, the value of the counter 3 is increased by 1. Concretely, the value of the counter 3 is changed from 1 to 2.

At the step B3, the value of the pointer is increased by 1. Concretely, the value of the pointer is changed from 4 to 5. Hence, the word "year" is remarked.

At the step B4, it is determined whether or not the counter 3 indicates the parallel word. Now, since the word indicated by the counter 3 is "year", the operation goes to the step B5.

At the step B5, it is determined whether or not the word pointed by the pointer is the same as the word pointed by the counter 3. Now, since the counter 3 indicates the word "year" and the pointer indicates the word "year", both of the words are matched to each other. Then, the operation goes to the step B8.

At the step B8, the value of the counter 3, that is, 2 is compared with 3 (=word number–1). Since the former is smaller than the latter, the operation goes to the step B2.

At the step B2, the counter 3 indicates a value of 3. At the step B3, the pointer indicates a value of 6.

At the step B4, the counter 3 indicates not the parallel word train but the word "round".

At the step B5, it is understood that the word "round" pointed by the pointer is the same as the word "round" pointed by the counter 3. Then, the operation goes to the step B8.

At the step B8, the value 3 of the counter 3 is compared with 3 (=word number–1) and both of them are made equal to each other. Hence, the operation goes to the step B9. The equality indicates that matching of the inputted words to the candidate idiom is done well.

At the step B9, this is a process for storing the information of the successful idiom in the memory. The information is represented in FIG. 17.

At the step B10, the number of candidate idioms in the idiom list is substituted in the counter 2. This is because this process is executed only when matching of the inputted words to one candidate idiom has been already made successful and for avoiding matching to the idioms in the idiom candidate list or unchecked idioms. By replacing the candidate number in the counter 2, this process makes it possible to apparently terminate the overall process. In this case, the candidate number 3 of the idiom is substituted in the counter 2. Though such an operation is executed in the flowchart, if the user desires to check all the candidates, the processes at the steps B10 and B11 should be removed.

The process at the step B11 is executed to substitute the value of the pointer in the counter 1. This is done for stopping to find out the idioms starting from the word "year" or "round", because the words from the word "all" indicated by the counter 1 to the word "round" indicated by the pointer are determined as an idiom. Now, since the value of the pointer is 6, the value of the counter 1 changes from 4 to 6. Then, the operation returns to the original calling side.

At the step A6, the value of the counter 2 is compared with the number of idiom candidates. Now, since the value of the counter 2 is 3 and matches to the number of candidates. The operation returns to the original calling side.

Then, the operation transfers to the step M6. At this step M6, the value of the counter 1 is compared with the number of the inputted words. If both of them are equal to each other, it means that all the inputted words are checked. Now, since the value of the counter 1 is 6 and the number of the inputted words is 6, the process for checking an idiom is terminated.

Then, this result (dictionary-consulted result at the step M1 and information of the matched idiom (see FIG. 43)) is passed to the syntactic analyzing unit as stated in the first embodiment. The later process is the same as the process of "This is a pen" in the first embodiment. At last, the translated counterpart "" is generated.

The foregoing method may not apply to such an idiom as starting from a parallel symbol. How such an idiom registered in the dictionary and how it is matched to the inputted words will be described below.

Like the idiom list shown in FIG. 14, it is necessary to establish the head of the English word. Provided that the header words each starting from [ ] are registered as a list, it is necessary to check if all the words of the inputted sentence are matched to all the idioms starting from [ ]. The following two methods may apply to the checking operation.

(1) Developing the idiom when registering it

For the idiom starting from [ ], only the head [ ] is developed when registering the idiom. For example, consider the idiom of "[A|B|C]DE[F|G] is registered. In this case, the system operates to automatically develop it as "ADE[F|G]", "BDE[F|G]" and "CDE[F|G]".

By registering it as three divisional parts, the idiom is allowed to be processed by the same process as the foregoing process by using the flowchart of FIG. 10.

In the aforementioned method, for the idiom having two [ ]s at the head and the location next to the head, both of [ ]s have to be developed. This results in disadvantageously making the operation less efficient:. For example, when an idiom of "[A|B][C|D|E]F" is registered, the system is requested to develop it as "ACF", "ADF", "AEF", "BCF", "BDF", and "BDF". Hence, the succession of [ ] from the head in the idiom results in increasing the number of the items to be developed, thereby lowering the operating efficiency.

(2) Changing a word range when registering an idiom

This is a method for replacing the head [ ] at the back location if the idiom starting from [ ] is registered. For example, when a user registers the idiom of "[A|B|C]DE [F|G], the system operates to automatically rearrange it as "DE[F|G] [A|B|C]" and add the information indicating the replacement of [A|B|C]. This method can cope with such an idiom having successive [ ]s from the head. For example, when a user registers the idiom of "[A|B] [C|D|E|F] [G|H] IJ", the system operates to register it as "IJ[G|H] [C|D|E|F] [A|B] and add the location information to [G|H].

The rearranged words [G|H] [C|D|E|F] [A|B] from the parallel words [A|B] [C|D|E|F] [G|H] are added at the back of the last word J of the idiom when registering it. The location information is added to [G|H] in order to indicate that the words of [G|H] or later of "IJ[G|H] [C|D|E|F] [G|H]" are rearranged.

The improvement of the flowchart of FIG. 10 for corresponding to the rearranged idiom results in becoming the flowchart of FIG. 18. The changed point is indicated by the addition of ' to the step number.

Figure 44A:
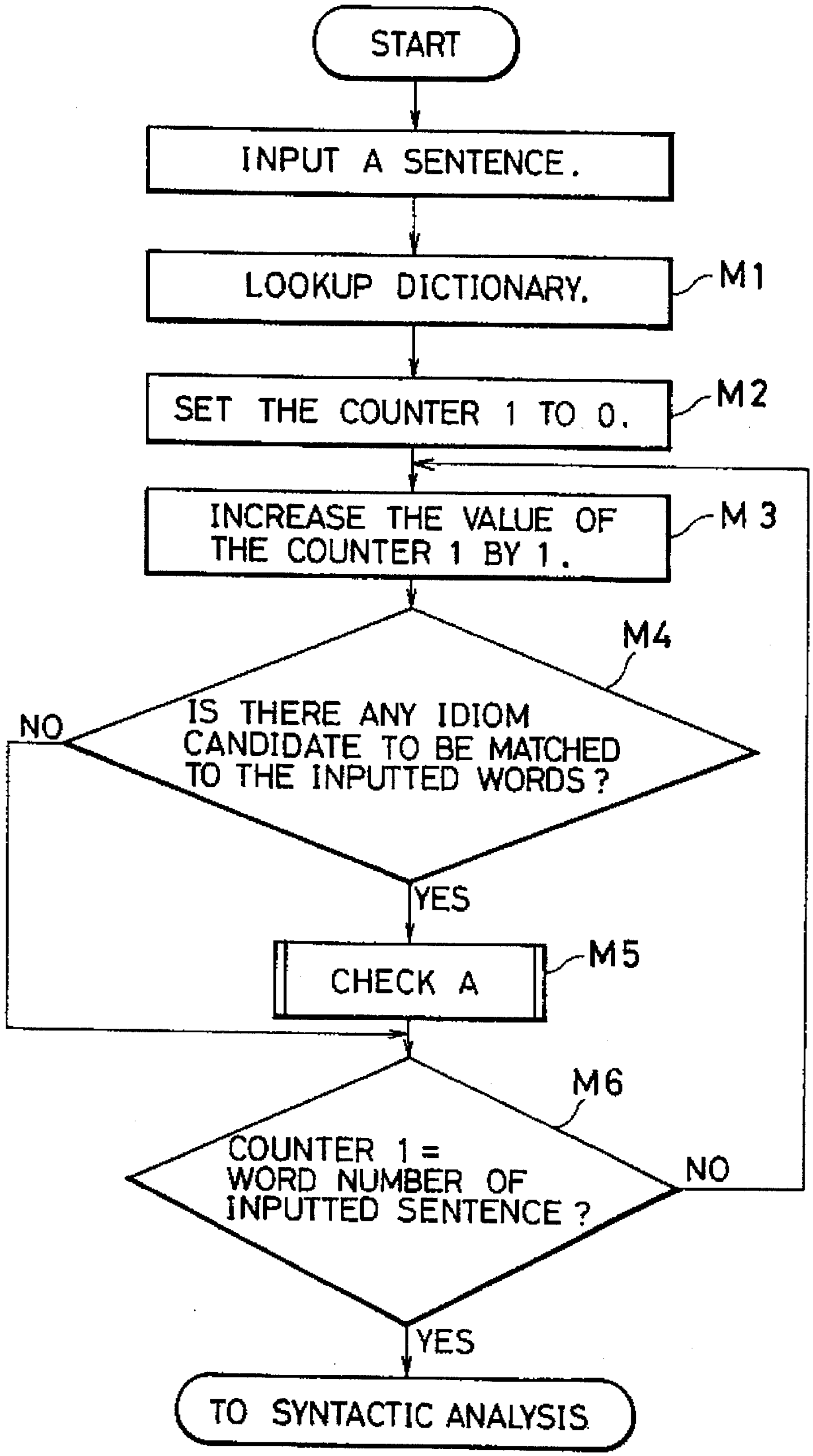
FIGS. 44A to 44F are flowcharts showing an operation to be done for an idiom registered as rearranged words in the translation machine shown in FIG. 36.

The flowchart of FIG. 44A will be briefly described as taking an example of an inputted sentence.

To simplify the description, it is assumed that only the idiom shown in FIG. 45 is registered. The idiom shown in FIG. 45 is rearranged by the system when it is registered. The user actually registers an English header as "[in|on] behalf of".

Figure 39:
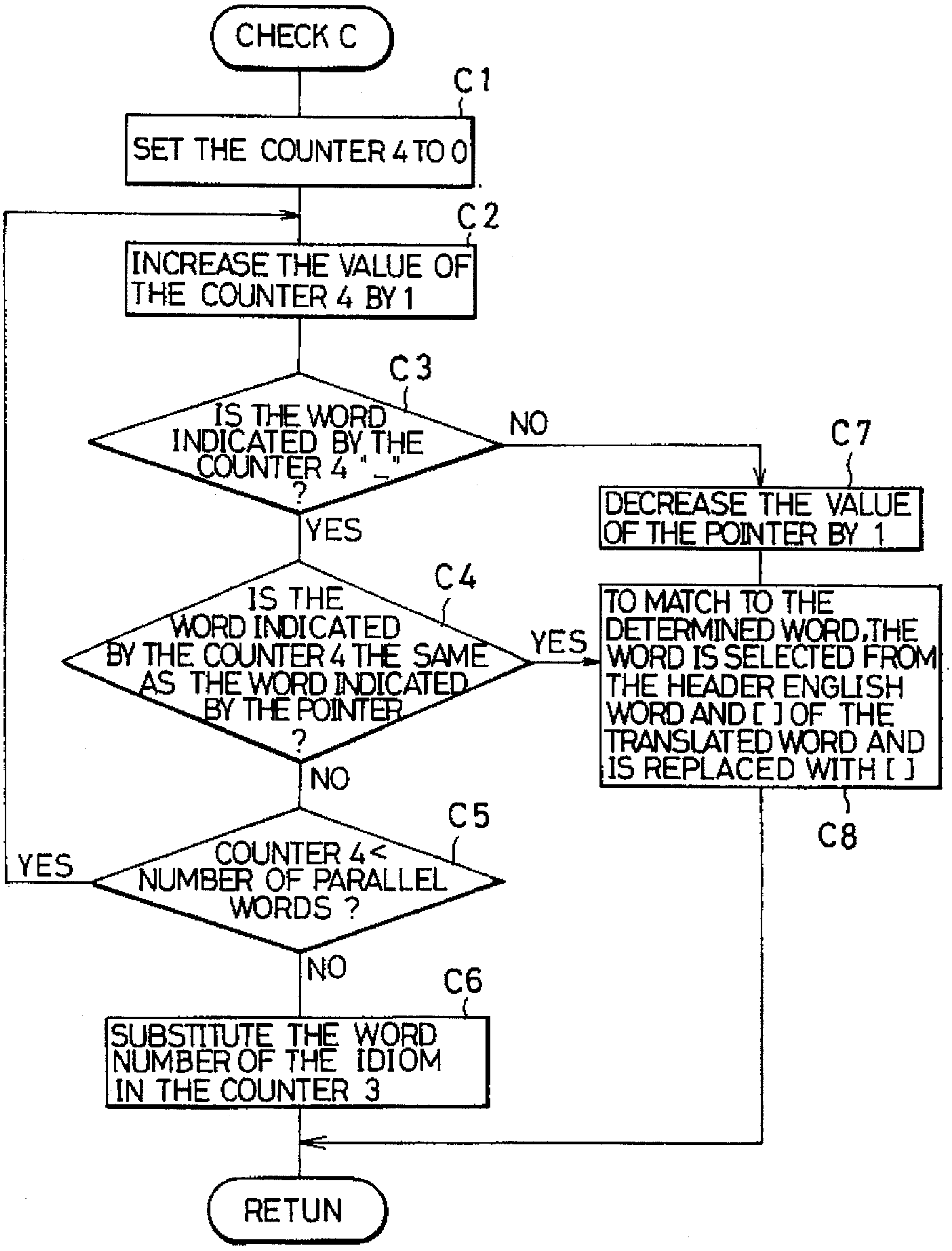

Now, assume that the sentence of "I work in behalf of her" is inputted. FIG. 46 shows the words of the inputted sentence indicated by numbers. Until the value of the counter 1 is 4, the word "behalf" is remarked and the idiom candidate list is created at the step A1", the operation is done similarly to the foregoing flowchart of FIG. 39.

At first, the idiom list is created to have the English headers and the location information (see Step A1"). The idiom list is shown in FIG. 47.

Then, the value of the counter 2 becomes 1 and the value of the pointer becomes 4. Then, the operation goes to the process at the step B1".

The counter 3 is reset to 0 and the flag is set to 0 (step B1"). This flag is set to 1 when the word before the word indicated by the counter 1 is checked for searching the symbol [ ] located before.

After the value of the counter 3 becomes 1, the operation goes to the step B3". Then, "sub1" is called (step B3") and then the operation goes to the step S1 (see FIG. 44E).

At the "sub1", it is determined whether or not the location information indicated by the counter 3 is 0 (step S1). If the location information is not 0, the word indicated by the counter 3 is the first one of the rearranged words. Hence, the operation goes to a step S2. Now, since the value of the counter 3 is 1, the location information is understood to be 0 from FIG. 47. Then, the operation goes to the step S2.

At the step S2, it is determined whether or not the flag is set to 1. Now, since the flag is set to 0, the operation goes to a step S3. The value of the pointer is increased by 1 and then changes to 5 (step S3). This process corresponds to the process at the step B3 of FIG. 39.

Next, at a step S4, a value of the pointer is substituted in the stack. This stack indicates the remarked words from the head of the inputted sentence. Now, since the value of the stack is 5, the remarked words are from the head to "of". Then, the operation returns to the calling side and then the operation goes to the step B4.

At the step B4, the counter 3 indicates the word "of". It is not a parallel word range. Hence, the operation goes to the step B5.

At the step B5, it is determined whether or not the word indicated by the pointer is matched to the word indicated by the counter 3. Since both of them are matched to each other, the operation goes to a step B8. At the step B8, it is determined whether or not the value (=1) of the counter 3 is smaller than or equal to 2 (=word number−1). Since the former is smaller than the latter, the operation goes to the step B2. Then, the value of the counter 3 is made to 2. Then, the operation goes to the step B3" at which "sub1" is called.

At the step S1, the location information indicated by the counter 3 is 1. Hence, the operation goes to a step S6 (see FIG. 44E). At the step S6, the flag is set to 1. If so, it means that the word before the word indicated by the counter 1 is checked.

At a step S7, the value of the pointer is substituted in the stack. This is the same as the process at the step S4. Now, the value of the stack is 5.

At a step S8, the value of the counter 1 plus 1 is substituted in the pointer. This is a process for bringing back the word remark. Now, since the value of the counter 1 is 4, a value of 3 (=4−1) is substituted in the pointer.

The process is returned to the calling side and then the operation goes to a step B4.

At the step B4, the word indicated by the counter 3 is [in|of] having a parallel symbol. Hence, the operation goes to the step B7 at which a subroutine "check C" is called.

At the steps C1 and C2, the value of the counter 4 becomes 1.

At a step C3, the word indicated by the counter 4 is "in". Hence, the operation goes to the step C4. If the counter 4 indicates _, the operation goes to the step C7'.

Now, the process at the step C7' will be described.

At the step C7', "sub2" is called. Then, the operation goes to a step S9 (see FIG. 44F). At the step, it is determined whether or not the flag is set to 1. If the flag is set to 0, it means the normal process to be done when the word indicated by the pointer is located after the word indicated by the counter 1. In the process at the next step S10, the value of the pointer is reduced by one. This process corresponds to the omitted word and is the same as the process at the step C7 shown in FIG. 39D. If the flag is set 1, the pointer searches for the words before the word indicated by the counter 1. At the next step S11 the value of the pointer is increased by one. This is done for handling the value of the pointer in order to correspond to the omitted word.

Turning to FIG. 44D again, the process at the step C4 is executed. At this step, it is determined whether or not the word "in" indicated by the counter 4 is the same as the word "in" indicated by the pointer 3. Since both are the same, the operation goes to the step C8. At the step C8, the English header word shown in FIG. 45 is replaced with "behalf of in". No process is done for the part of speech, the translated counterpart, the part of speech for the translated counterpart rows, because they do not contain [ ].

The process returns to the calling side and the operation returns to the step B8.

At the step B8 (see FIG. 44C), it is determined that the value 2 of the counter 3 is equal to the value 2 counted by subtracting one from the number of the words. It means that the inputted sentence is matched to the idiom. Then, the operation goes to the step B9'.

At the step B9', the information of the successful idiom is stored in the memory. If the idiom is rearranged when it is registered, the rearranged idiom is recovered when it is stored. Concretely, the English header "behalf of in" is stored as "in behalf of". The result is shown in FIG. 37. At the step B10 (see FIG. 44C), the value of the counter 2 is made to be 1.

At a step B11, the value of the stack is substituted in the counter 1. This is done because the idiom is delimited by the word indicated by the stack. Concretely, the value of the stack is 5 and the idiom is delimited by the word "of". Hence, the value of the counter 1 is made to be 5.

Figure 44B:
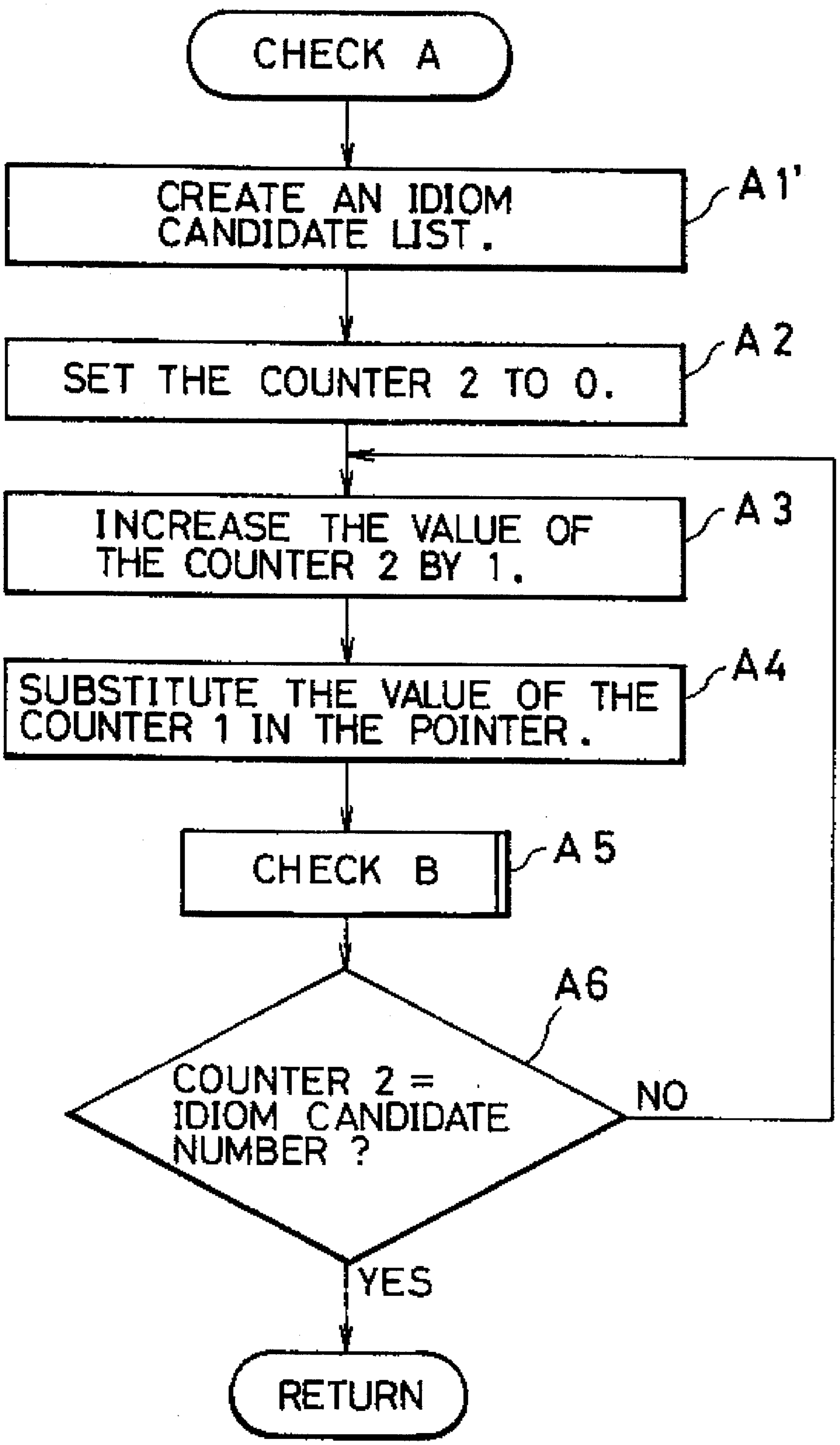
Figure 44C:
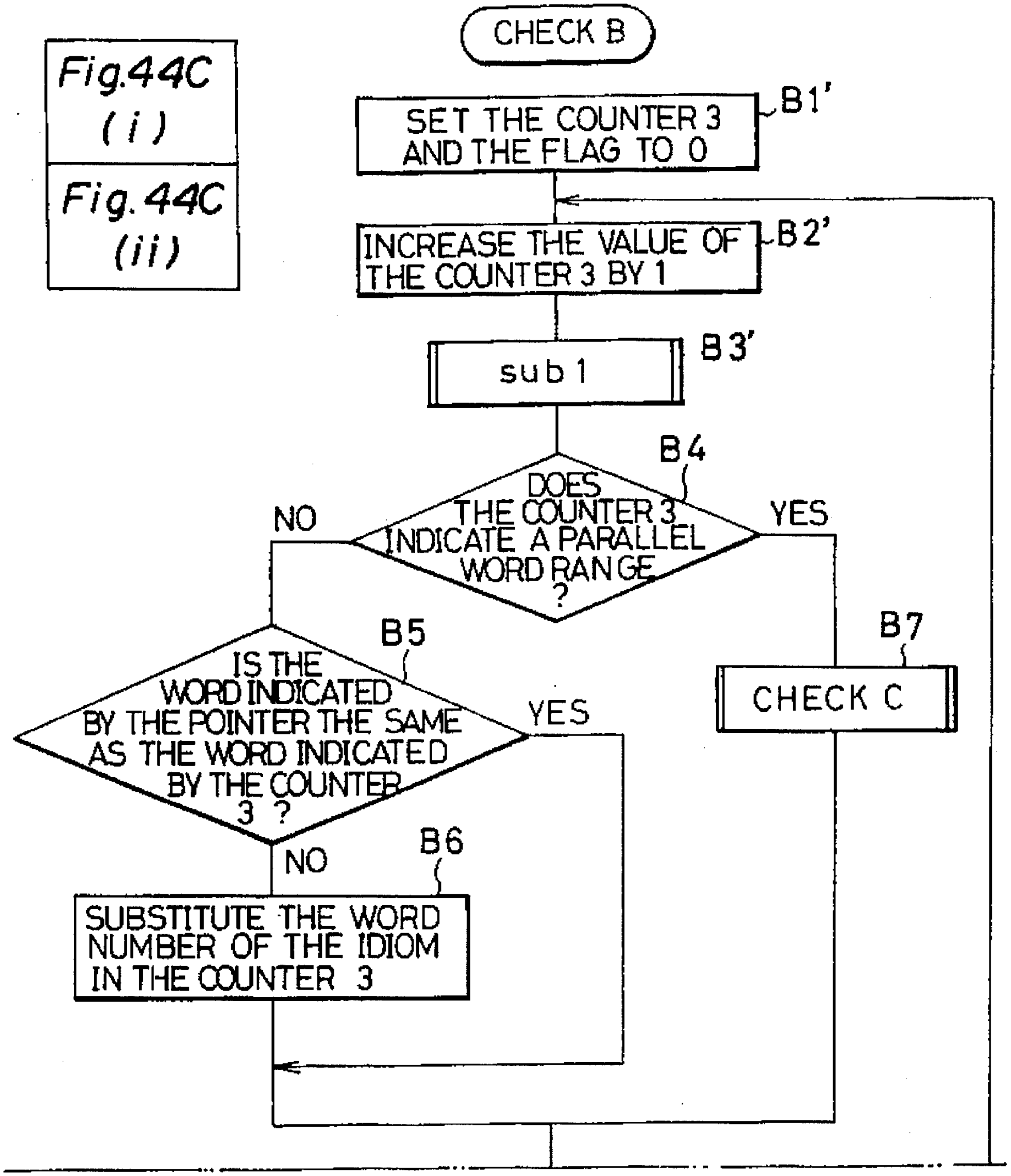
Figure 44D:
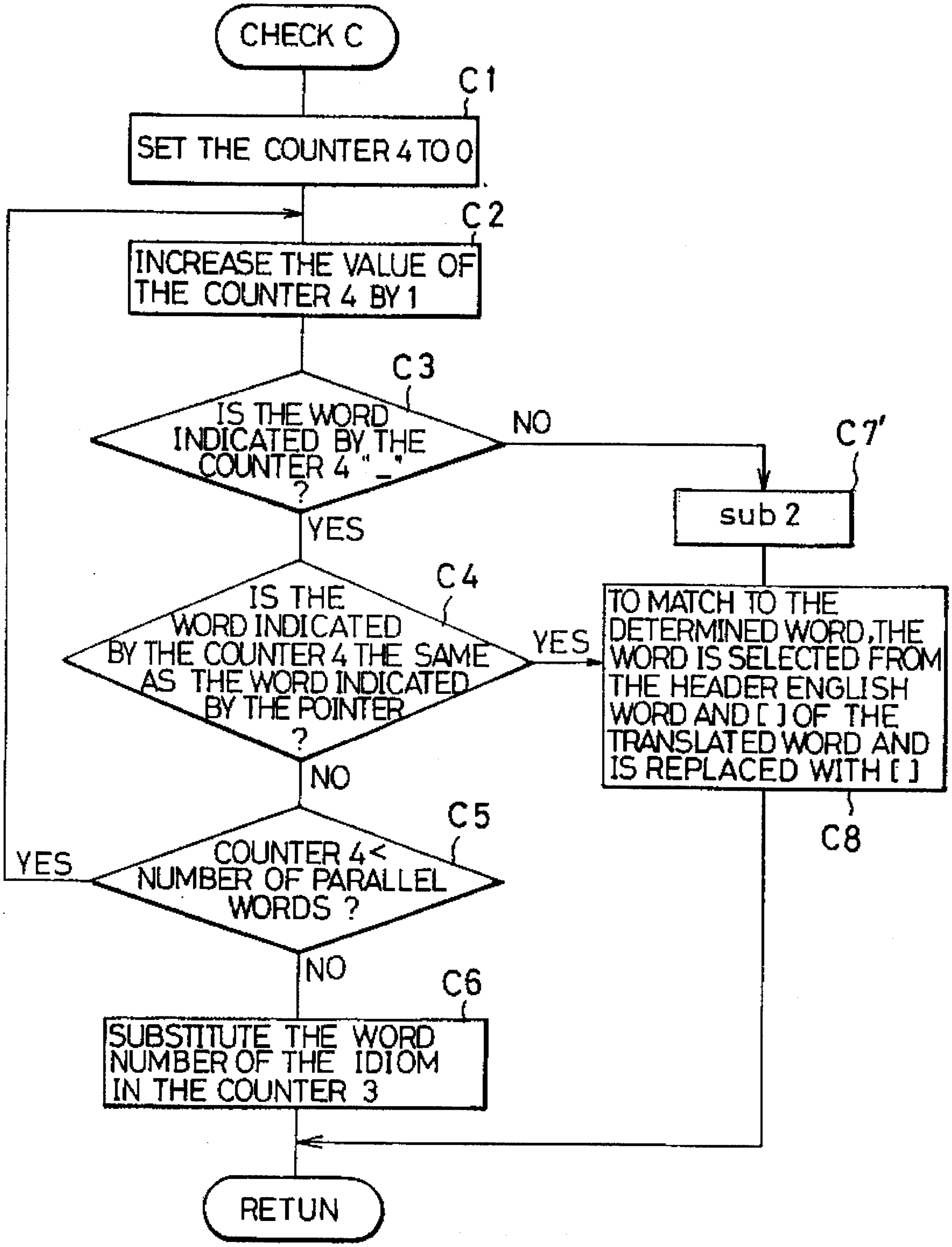
Figure 44E:
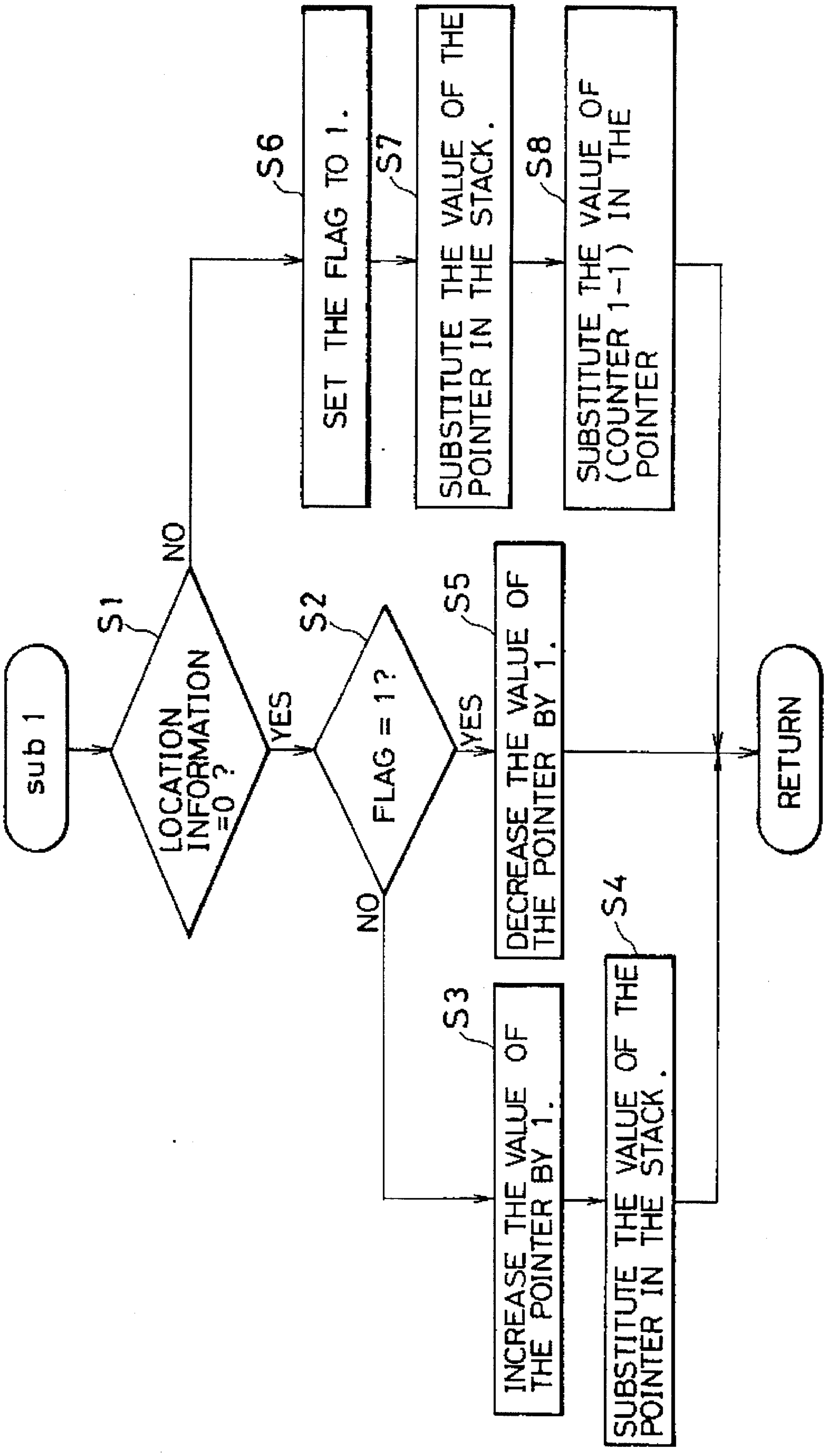
Figure 44F:
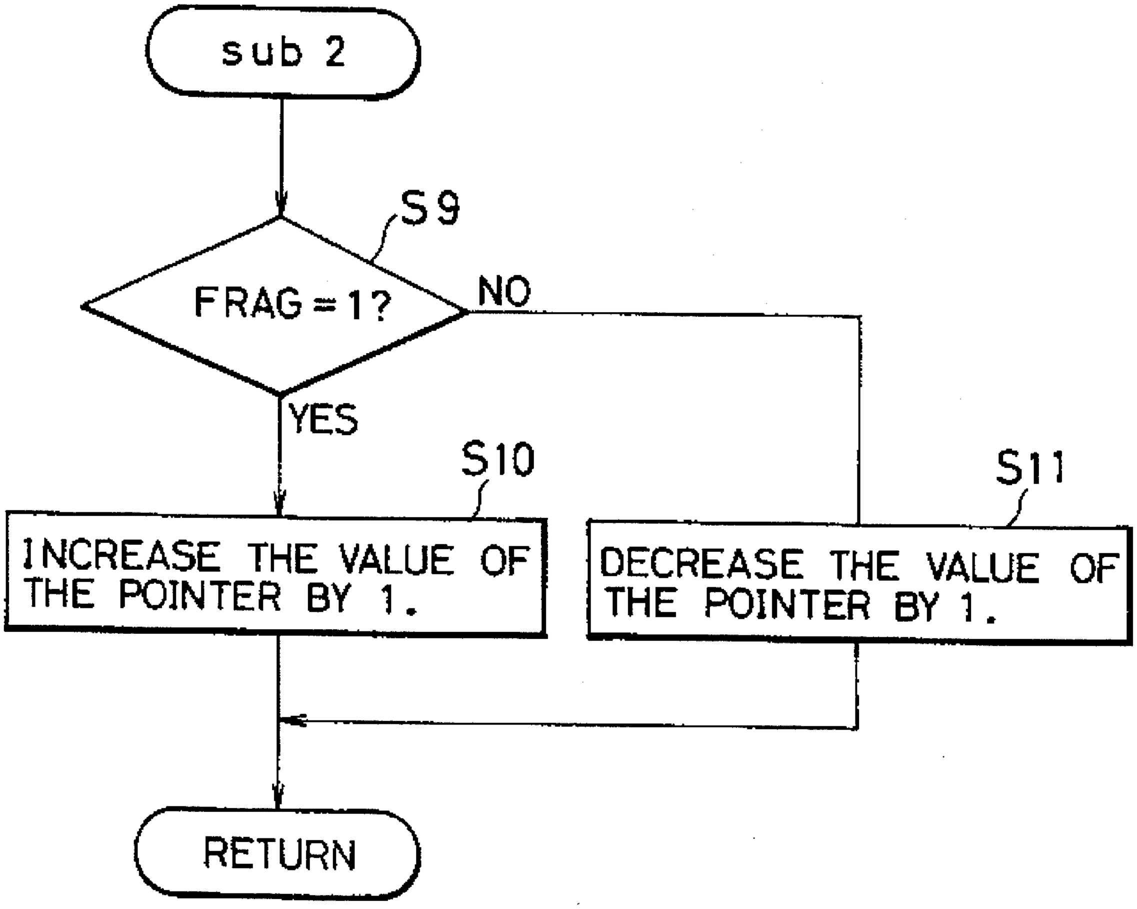

Then, the operation returns to the calling side, and then goes to the step A6 (see FIG. 44B). At the step A6, it is determined that the value of the counter 2 (=1) is equal to the number of idiom candidates (=1). Then, the operation returns to the original calling side and goes to the step M6 (see FIG. 44A).

At the step M6, the counter 1 indicates 5, which is smaller than the number of words of the inputted sentence. Hence, the operation goes to the step M3.

At the step M3, the counter 1 indicates 6. At the step M4, there is no idiom candidate matched to the word "her". Hence, the operation goes to the step M6 again. At this step, it is determined that the counter 1 indicates 5 and it is smaller than the number of the words of the inputted sentence. Hence, the operation goes to the step M3.

At the step M3, the counter 1 indicates 6. At the step M4, there is no idiom candidate matched to "her". Again, the operation goes to the step M6. At this step, it is determined that the value of the counter 1 is equal to the number of the words of the inputted sentence. This means termination of checking idioms.

Then, the result is passed to the normal syntactic analysis. The later process is the substantially same as the translating process of "This is a pen" described in the first embodiment. The resulting translated counterpart is made to be "".

Many widely different embodiments of the present invention may be constructed without departing from the spirit and scope of the present invention. It should be understood that the present invention is not limited to the specific embodiments described in the specification, except as defined in the appended claims.

What is claimed is:

1. A translation machine comprising:

input means for inputting a character string and a symbol;

means for registering a header word with a plurality of symbols in a compound format and a translated counterpart of an idiom, when said idiom includes a plurality of variable parts or a variable part having a plurality of attributes, each of said symbols representing a predetermined attribute of a variable part of an idiom;

means for storing an idiom, a dictionary required for the translating process, and a processed result;

dictionary lookup and morphological analyzing means for breaking an inputted word train into morphemes and grammatically analyzing said morphemes;

idiom translating means for identifying an inputted character string, or part thereof and its attribute with the registered header word and the symbols of the idiom and generating a translated word corresponding to the identified idiom;

syntactic analyzing means for analyzing syntax of an inputted sentence of a source language;

syntax transforming means for transforming said analyzed syntax of a source language into the syntax of a target language;

means for generating a translated counterpart based on said syntax of a target language; and output means for outputting the generated translated counterpart.

2. A translation machine as claimed in claim 1, wherein a representative symbol for a center word standing for a part of speech of an overall idiom is registered when an idiom includes a plurality of variable parts or a variable part having a plurality of attributes.

3. A translation machine as claimed in claim 1, wherein said storage means is composed of a dictionary memory having grammatical rules for translating an inputted translated sentence and information for translated words, a buffer memory for storing the process up to the creation of a translated word, and an idiom registering memory for storing an idiom registered by the idiom registering means.

4. A translation machine as claimed in claim 1, wherein said dictionary lookup and morphological analyzing means is composed of a part of speech extracting unit for breaking an inputted character string and generating information about a part of speech of each word and a translated word extracting unit for generating a candidate of a translated word of each word.

5. A translation machine as claimed in claim 1, wherein said idiom translating means is composed of an idiom retrieving unit for retrieving the idiom registering memory and selecting a header word candidate of the idiom to be matched in the representative format to the broken word train, an idiom identifying part for specifying the idiom candidate which has the attribute of a representative symbol matched to the attribute of a word or a word train corresponding to the location of the representative symbol in the idiom, an idiom analyzing unit for analyzing a syntax of a word or a word train corresponding to the representative symbol and generating a syntax of an overall idiom, and an idiom translated word generating unit for generating a translated word of the idiom of an inputted word train based on the syntax of the idiom.

6. A translation machine comprising;

means for registering a plurality of groups of words or word trains each sharing a certain feature in a classifying table;

means for registering a header having a plurality of symbols in a compound format and a translated word of an idiom with a special symbol standing for one of said groups when said idiom includes a plurality of variable parts or a variable part having a plurality of attributes, each of said special symbols representing a predetermined attribute of a variable part of an idiom;

means for identifying a word train of an inputted original sentence with said registered header of the idiom; and means for outputting a translated word corresponding to said identified header of the idiom.

7. A translation machine provided with an idiom registering unit, said idiom registering unit comprising:

first registering means for registering a group of idioms each having a similar structure with a header having a plurality of symbols in a compound format and parallel symbols when said group of idioms includes a plurality of variable parts or a variable part having a plurality of attributes, each of said special symbols representing a predetermined attribute of a variable part of an idiom;

first identifying means for identifying an idiom contained in an inputted original sentence with said header;

output means for outputting a translated word for a matched word in said parallel symbols when the translated word for an idiom identified by said first identifying means is written by said parallel symbols;

second registering means for registering an idiom containing a predetermined variable word; and second identifying means for identifying an idiom registered by said second registering means with said inputted sentence.

* * * * *